United States Patent [19]
Hirabayashi et al.

[11] Patent Number: 5,321,539
[45] Date of Patent: Jun. 14, 1994

[54] LIQUID CRYSTAL FABRY-PEROT ETALON WITH GLASS SPACER

[75] Inventors: Katsuhiko Hirabayashi, Atsugi; Hiroyuki Tsuda, Zama; Takashi Kurokawa, Yono, all of Japan

[73] Assignee: Nippon Telegraph and Telephone Corporation, Tokyo, Japan

[21] Appl. No.: 829,383

[22] Filed: Feb. 3, 1992

[30] Foreign Application Priority Data

Feb. 4, 1991 [JP] Japan .................................. 3-013414
Jul. 15, 1991 [JP] Japan .................................. 3-174164
Nov. 11, 1991 [JP] Japan .................................. 3-294673

[51] Int. Cl.$^5$ ...................... G02F 1/137; G02B 27/00
[52] U.S. Cl. ........................ 359/94; 356/352; 359/70; 359/66; 359/93; 359/578
[58] Field of Search ............ 359/39, 41, 42, 66, 359/70, 71, 94, 251, 578, 260, 245, 256, 259, 93, 74; 356/352; 250/227.23, 227, 17; 385/27, 28; 372/20, 105

[56] References Cited

U.S. PATENT DOCUMENTS

| | | | |
|---|---|---|---|
| 3,982,820 | 9/1976 | Hattori et al. | 359/74 |
| 3,995,937 | 12/1976 | Baues et al. | 385/14 |
| 4,191,452 | 3/1980 | Grinberg et al. | 359/72 |
| 4,221,472 | 9/1980 | Smith et al. | 356/352 |
| 4,550,410 | 10/1985 | Chenausky et al. | 372/20 |

(List continued on next page.)

FOREIGN PATENT DOCUMENTS

| | | |
|---|---|---|
| 0260073 | 3/1988 | European Pat. Off. |
| 0384117 | 8/1990 | European Pat. Off. |
| 58-35424 | 2/1983 | Japan |
| 62-178219 | 5/1987 | Japan |

(List continued on next page.)

OTHER PUBLICATIONS

Patel et al., "Electrically Tunable Optical Filter for Infrared Wavelength Using Liquid Crystals in Fabry-Perot Etalon", Applied Physics Letters, (17) 22 Oct. 1990 pp. 1718-1720.

"Multiwavelength Tunable Liquid-Crystal Etalon Filter" Patel et al., IEEE Photonics Technology Letters, vol. 3 No. 7, Jul. 1991, pp. 643-644.

"Tunable Polarization Diversity Liquid-Crystal Wavelength Filter" Patel et al., IEEE Photonics Technology Letters, vol. 3, No. 8, Aug. 1991. pp. 739-740.

(List continued on next page.)

Primary Examiner—William L. Sikes
Assistant Examiner—Kenneth Parker
Attorney, Agent, or Firm—Spencer, Frank & Schneider

[57] ABSTRACT

A tunable wavelength-selective filter includes a glass substrate, a transparent electrode layer, a highly reflective mirror, an alignment layer, a liquid crystal layer, another alignment layer, a transparent material layer whose refractivity index is substantially equal to that of the liquid crystal layer, another highly reflective mirror, another transparent electrode layer, and another glass substrate, which are stacked in this order. An etalon cavity of the filter includes two layers, the liquid crystal layer and the transparent material layer (such as a glass plate), which enables the cavity length to be increased without increasing absorption and scattering of the cavity. This makes it possible to narrow the FWHM, quicken the response time, and increase the transmittance of the filter. Applications for the filter include a double cavity structure tunable wavelength-selective filter of a wide tunable range, and a photodetector of a simple construction.

44 Claims, 18 Drawing Sheets

U.S. PATENT DOCUMENTS

| | | |
|---|---|---|
| 4,779,959 | 10/1988 | Saunders . |
| 5,041,779 | 8/1991 | Hales ................................ 356/352 |
| 5,068,749 | 11/1991 | Patel .................................. 356/352 |
| 5,111,321 | 5/1992 | Patel ..................................... 359/94 |
| 5,218,422 | 6/1993 | Zoechbauer ..................... 356/352 |

FOREIGN PATENT DOCUMENTS

| | | |
|---|---|---|
| 63-5327 | 11/1988 | Japan . |
| 3279827 | 12/1991 | Japan . |
| 2219099 | 11/1989 | United Kingdom . |
| 2222464 | 3/1990 | United Kingdom . |

OTHER PUBLICATIONS

"Polyimide (FLUPI)", Sasaki, Plastics, vol. 42, No. 9 pp. 47–50.

"Polyimide Derived from 2,2'-Bis(trifluoromethyl)-4,4'-diaminobiphenyl". Matsuura et al., Macromolecules 1991, vol. 24, No. 18, pp. 5001-5005.

M. Hashimoto "An Optical Resonator type Wavelength Selector Using Liquid Crystal (2)", 1986, Japan.

S. R. Mallinson "Wavelength-selective filters for single-mode fiber WDM systems using Fabry-Perot interferometers", Applied Optics, vol. 26, No. 3, Feb. 1, 1987.

M. W. Maeda et al, "Novel Electrically Tunable Filter Based on a Liquid-Crystal Fabry-Perot Etalon for High-Density WDM Systems", ECOC '90, 145-148.

M. W. Maeda et al, "Electronically Tunable Liquid-crystal-Etalon Filter for High-Density WDM Systems", IEEE Photonics Technology Letters, V. 2, N.11, Nov. 1990.

LIQUID CRYSTAL FABRY-PEROT ETALON WITH GLASS SPACER

BACKGROUND OF THE INVENTION

1. Field of the Invention

The present invention relates to an electrically tunable wavelength-selective filter whose resonance wavelength is variable so that it can select a desired optical signal of an intended wavelength from wavelength division multiplexed optical signals transmitted through an optical fiber.

2. Description of the Prior Art

Optical fiber communications have increased at a rapid rate recently, because of their tremendous information carrying capacity. The current optical communications, however, transmit only a coded pulse stream, ignoring wavelength information. Transmission of many optical pulse streams of diverse wavelengths might further increase information carrying capacity. This technique is termed wavelength division multiplexing (WDM), and has been intensively studied. In wavelength division multiplexing, a tunable wavelength-selective filter is needed that can select an intended optical signal from a great number of optical signals of different wavelengths. In particular, a filter is required having a narrow bandwidth, a wide tunable range, and a low loss.

Conventional filters of this kind include a grating monochromator whose grating is controlled by a motor, an etalon whose resonator length is controlled by a piezoelectric cell, a semiconductor optical waveguide tunable wavelength-selective filter including a Bragg reflector, and a planar light wave Mach-Zehnder interferometer formed on an Si substrate. Each of them, however, has its own disadvantages: The grating monochromator and the etalon are bulky because they are mechanically controlled; the semiconductor optical waveguide filter has only a narrow tunable range and the Mach-Zehnder interferometer must be connected in a number of stages in cascade, and further requires a complicated control system.

To eliminate the disadvantages of the mechanical filters or the semiconductor optical waveguide filter, we proposed a tunable liquid crystal wavelength-selective filter. It includes a liquid crystal contained in a Fabry-Perot interferometer, and its optical length can be varied by applying a voltage (Japanese Patent Application No. 2-71901, 1990).

A tunable liquid crystal wavelength-selective filter is characterized by such features as small size, low driving voltage, and low cost.

FIG. 1 is cross-sectional view illustrating an arrangement of a conventional tunable liquid crystal wavelength-selective filter. It comprises a liquid crystal 1 sandwiched between alignment layers 3A and 3B, dielectric mirrors 4A and 4B, transparent electrodes 5A and 5B, glass substrates 8A and 8B, and antireflection (AR) coatings 9A and 9B. Its cavity gap, that is, the distance between the two dielectric mirrors 4A and 4B is on the order of a few micrometers to an order around ten micrometers. The liquid crystal 1 is a nematic liquid crystal, and its molecules are aligned parallel to the surface (homogeneous ordering).

Typical characteristics of the conventional tunable liquid crystal wavelength-selective filter are as follows: The bandwidth is approximately 0.3–0.6 nm; the loss is 2–3 dB: the tunable range is about 50–100 nm; and the finesse is 150–250. In an etalon filter, a range five times the bandwidth gives an extinction ratio of about 20 dB, and hence, wavelength spacing of 2 nm enables the filter to be applied to wavelength division multiplexing with 50 divisions. Frequency division multiplexing (FDM), however, requires a bandwidth equal to or less than 0.1 nm in practice. The bandwidth can be narrowed by increasing the cavity length of an etalon filter. A cavity gap of 70 μm, for example, gave a bandwidth of 0.1 nm and a tunable range of 10 nm, although it cause the problem that its loss increase to 10 dB. In addition, the 70 μm cavity gap remarkably delay the response time, to the order of several tens of seconds.

Furthermore, the tunable liquid crystal wavelength selective filter has another disadvantage in that it exhibits polarization dependence. In other words, although it operates as a tunable wavelength-selective filter for light whose polarization direction is parallel to the liquid crystal molecules, it cannot operate for light whose polarization direction is perpendicular to the liquid crystal molecules.

Table 1 shows the characteristics of the above-mentioned tunable wavelength-selective filters for purposes of comparison. All the filters have a limited number of selective channels, from several tens to one hundred, and hence, a narrower bandwidth and a wider tunable range are required.

TABLE 1

CHARACTERISTICS OF TUNABLE WAVELENGTH-SELECTIVE FILTER

| Filter | Bandwidth (GHz) | Tunable Range (nm) | LOSS (dB) | Selective Number |
|---|---|---|---|---|
| 1 | <several tens | >100 | 1–2 | 100 |
| 2 | 10 | 3 | 10 | 10 |
| 3 | 5 | 10 | 3–5 | 128 |
| 4 | 38 | 30 | 3 | Several tens |
| 5 | 60 | 140 | 2 | 50 |

NOTES:
1: mechanical grating monochromator
2: semiconductor filter
3: waveguide Mach-Zehnder interferometer
4: mechanical fiber Fabry-Perot Interferometer
5: liquid crystal filter
125 GHz corresponds to 1 nm.

Incidentally, the tunable liquid crystal wavelength-selective filter is described in the following articles:

(1) Masashi HASHIMOTO "An Optical Resonator Type Wavelength Selector Using Liquid Crystal (2)", 1986, Japan.

(2) Stephen R. Mallinson "Wavelength-selective filters for single-mode fiber WDM systems using Fabry-Perot interferometers", APPLIED OPTICS, Vol. 26, No. 3, Feb. 1, 1987.

(3) M. W. Maeda, et al. "Novel Electrically Tunable Fiber Based on a Liquid-Crystal Fabry-Perot Etalon for High-Density WDM Systems", ECOC '90-145.

(4) M. W. Maeda, et al. "Electronically Tunable Liquid-crystal-Etalon Filter for High-Density WDM Systems", IEEE PHOTONICS TECHNOLOGY LETTERS, VOL. 2, NO. 11, NOVEMBER 1990.

On the other hand, wavelength division multiplexing requires a photodetector that has a tunable wavelength-selective function so that an intended optical signal is selected from a number of optical signals of different wavelengths.

FIGS. 2 and 3 illustrate conventional photodetectors with a tunable wavelength-selective filter.

In FIG. 2, an intended wavelength is variably selected by adjusting the angle of a grating 21. Reference numeral 22 designates a lens. To improve the resolution, it is necessary to elongate the distance between an incident fiber 24 and a photodetector 23, which makes the arrangement large. In addition, it is fragile against mechanical shocks.

To eliminate these disadvantages, a photodetector as shown in FIG. 3 is proposed. It comprises a tunable liquid crystal wavelength-selective filter 35 having liquid crystal retained in a Fabry-Perot interferometer. Reference numerals 38 and 29 denote birefringent prisms and λ/2 plates, respectively. This photodetector has advantages in that it is small in size, uses a low driving voltage, and is low cost. In addition, since it is solid state, it is strong against mechanical shock. However, it requires a considerable effort for fiber coupling alignment because single-mode fibers 34 are connected to both ends. Further, it costs much because birefringent prisms 38, or polarization beam splitters as their alternatives, are needed at the input side and the output side.

SUMMARY OF THE INVENTION

Accordingly, it is an object of the present invention to provide an electrically tunable wavelength-selective filter having a cavity of reduced absorption and scattering, so that it can achieve high transmittance and a narrow FWHM (Full Width at Half Maximum) and can be applied to frequency division multiplexing in a 1.3-1.55 μm band.

Another object of the present invention is to provide a tunable wavelength-selective filter whose bandwidth is narrow, such as less than 0.1 nm, and whose tunable range is wide, such as greater than 100 nm.

Still another object of the present invention is to provide a polarization-independent photodetector of a simple structure that can variably select a desired wavelength.

In a first aspect of the present invention, there is provided an electrically tunable wavelength-selective filter comprising:
  a first glass substrate;
  a first transparent electrode layer;
  a first high reflective mirror;
  a first alignment layer;
  a liquid crystal layer;
  a second alignment layer;
  a transparent material layer whose refractive index is substantially equal to that of the liquid crystal of the liquid crystal layer;
  a second high reflective mirror;
  a second transparent electrode layer; and
  a second glass substrate;
which are arranged in this sequence.

Here, the transparent material layer may be a glass plate.

The thickness d1 of the liquid crystal layer and the thickness d2 of the glass plate may satisfy the condition that the ratio d2/d1 falls in a range from 0.8A to 1.2A inclusive, where
  $A = 0.75(ne-no)m/ne - 1$,
  $m = 2ne(d1+d2)/\lambda m$,
  ne is the extraordinary refractive index of the liquid crystal,
  no is the ordinary refractive index of the liquid crystal, and
  λm is the transmission peak wavelength.

The transparent material layer may be an organic polymer layer.

In a second aspect of the present invention, there is provided an electrically tunable wavelength-selective filter comprising:
  a first tunable liquid crystal wavelength-selective filter; and
  a second tunable liquid crystal wavelength-selective filter which is stacked on the first tunable liquid crystal wavelength-selective filter;
  the first tunable liquid crystal wavelength-selective filter including:
  a first glass substrate;
  a first transparent electrode layer;
  a first high reflective mirror;
  a first alignment layer;
  a first liquid crystal layer;
  a second alignment layer;
  a transparent material layer whose refractive index is substantially equal to that of the liquid crystal of the liquid crystal layer;
  a second high reflective mirror;
  a second transparent electrode layer; and
  a second glass substrate;
  which are arranged in this sequence, and the second tunable liquid crystal wavelength-selective filter including:
  a third glass substrate;
  a third transparent electrode layer;
  a third high reflective mirror;
  a third alignment layer;
  a second liquid crystal layer;
  a fourth alignment layer;
  a fourth high reflective mirror;
  a fourth transparent electrode layer; and
  a fourth glass substrate;
which are arranged in this sequence.

The transparent material layer may be a glass plate or an organic polymer layer.

The first tunable liquid crystal wavelength-selective filter and the second tunable liquid crystal wavelength-selective filter may be stacked in such a manner that they are inclined with respect to each other.

The first tunable liquid crystal wavelength-selective filter may have a longer cavity gap than the second tunable liquid crystal wavelength-selective filter.

In a third aspect of the present invention, there is provided a photodetector comprising:
  an input optical fiber; lensing means for collimating light transmitted through the input optical fiber;
  a fiber connecting portion connecting the input optical fiber to the lensing means;
  polarization beam separation means for polarization separating the light transmitted through the lensing means into a first polarization light beam and a second polarization light beam;
  polarization rotation means for rotating the polarization of the second polarization light beam;
  an electrically tunable liquid crystal wavelengths-selective filter selectively transmitting the first and second polarization light beams;
  a focusing lensing means for focusing the first and second polarization light beams transmitted through the electrically tunable liquid crystal wavelength-selective filter; and
  photodetecting means for detecting the first and second polarization light beams focused by the focusing lensing means, wherein the electrically tunable liquid crystal wavelength-selective filter includes:
a first glass substrate;
a first transparent electrode layer;
a first high reflective mirror;
a first alignment layer;
a liquid crystal layer;
a second alignment layer;
a transparent material layer whose refractive index is substantially equal to that of the liquid crystal of the liquid crystal layer;
a second high reflective mirror;
a second transparent electrode layer; and
a second glass substrate;
which are arranged in this sequence.

The polarization rotation means may be a λ/2 plate.

The polarization rotation means may be a λ/4 plate and a mirror.

The polarization beam separation means may comprise a polarization beam splitter and a prism.

The polarization beam separation means may be a birefringent plate.

The polarization beam separation means may incline the incident beam with regard to the tunable liquid crystal wavelength-selective filter.

The photodetecting means may be a PIN photodiode or an avalanche photodiode.

The photodetector may further comprise a multimode optical fiber disposed between the focusing lensing means and the photodetecting means.

In a fourth aspect of the present invention, there is provided a photodetector comprising:
an input optical fiber;
lensing means for collimating light transmitted through the input optical fiber;
a fiber connecting portion connecting the input optical fiber to the lensing means;
polarization beam separation means for polarization separating the light transmitted through the lensing means into a first polarization light beam and a second polarization light beam;
polarization rotation means for rotating the polarization of the second polarization light beam;
an electrically tunable liquid crystal wavelength-selective filter selectively transmitting the first and second polarization light beams;
a focusing lensing means for focusing the first and second polarization light beams transmitted through the electrically tunable liquid crystal wavelength-selective filter; and
photodetecting means for detecting the first and second polarization light beams focused by the focusing lensing means;
wherein the electrically tunable liquid crystal wavelength-selective filter includes:
a first tunable liquid crystal wavelength-selective filter; and
a second tunable liquid crystal wavelength-selective filter which is stacked on the first tunable liquid crystal wavelength-selective filter,
the first tunable liquid crystal wavelength-selective filter including:
a first glass substrate;
a first transparent electrode layer;
a first high reflective mirror;
a first alignment layer;
a first liquid crystal layer;
a second alignment layer;
a transparent material layer whose refractive index is substantially equal to that of the liquid crystal of the liquid crystal layer;
a second high reflective mirror;
a second transparent electrode layer; and
a second glass substrate;
which are arranged in this sequence,
and the second tunable liquid crystal wavelength-selective filter including:
a third glass substrate;
a third transparent electrode layer;
a third high reflective mirror;
a third alignment layer;
a second liquid crystal layer;
a fourth alignment layer;
a fourth high reflective mirror;
a fourth transparent electrode layer; and
a fourth glass substrate;
which are arranged in this sequence.

In a fifth aspect of the present invention, there is provided a photodetector comprising:
an input optical fiber;
lensing means for collimating light transmitted through the input optical fiber;
a fiber connecting portion connecting the input optical fiber to the lensing means;
polarization beam separation means for polarization separating the light transmitted through the lensing means into a first polarization light beam and a second polarization light beam;
polarization rotation means for rotating the polarization of the second polarization light beam;
an electrically tunable liquid crystal wavelength-selective filter which selectively transmits the first and second polarization light beams; and
at least two photodiodes independently detecting the first and second polarization light beams transmitted through the electrically tunable liquid crystal wavelength-selective filter;
wherein the electrically tunable liquid crystal wavelength-selective filter includes:
a first glass substrate;
a first transparent electrode layer;
a first high reflective mirror;
a first alignment layer;
a liquid crystal layer;
a second alignment layer;
a transparent material layer whose refractive index is substantially equal to that of the liquid crystal of the liquid crystal layer;
a second high reflective mirror; and
a second transparent electrode layer,
which are arranged in this sequence, wherein the electrically tunable liquid crystal wavelength-selective filter and the photodiodes are integrally arranged in such a manner that the photodiodes are arranged on the second transparent electrode layer.

The electrically tunable wavelength-selective filter according to the first aspect of the present invention includes a cavity whose thickness is greater than that of the conventional normal type liquid crystal filter. The cavity is not entirely occupied by the liquid crystal, but comprises the transparent material layer, such as transparent glass, transparent plastics, or transparent organic polymers, having a refractive index equal to that of the liquid crystal. Thus, a filter of a narrow bandwidth, low loss and high response speed can be fabricated. This structure is termed "two layer cavity structure". A filter fabricated as a sample has a cavity gap 70 μm thick, a liquid crystal layer 15 μm thick, a transparent material layer 55 μm thick, and a mirror whose reflectivity is 99%.

The electrically tunable wavelength-selective filter according to the second aspect of the present invention includes a first filter and a second filter, which are stacked. The first filter is the narrow bandwidth filter according to the first aspect of the present invention, and the second filter is a conventional, normal type filter having a wide tunable range. The second filter selects a plurality of optical signals in a comb fashion, and the first filter selects one of the optical signals. The second filter of a wide bandwidth and wide tunable range is fabricated by reducing its cavity gap to about 5 μm, and by lowering the reflectivity of the mirrors to about 90%. The first filter and the second filter do not interfere because they are stacked in such a manner that they slope slightly with respect to each other.

The polarization independent photodetector according to the third aspect of the present invention includes a tunable liquid crystal wavelength-selective filter, and a polarization beam splitter, a prism and a λ/2 plate, which are disposed at the input side of the filter. A birefringent prism can be used as an alternative to the polarization beam splitter and prism. A light beam incident onto the polarization beam splitter is transmitted along two different paths. A first beam whose polarization direction is parallel to the liquid crystal molecules is transmitted through the filter, and a second beam whose polarization direction is perpendicular to the liquid crystal molecules is rotated by 90 degrees by the λ/2 plate before passing through the tunable liquid crystal wavelength-selective filter. The two beams are mixed by the lens. In this case, since the two beams pass two different points, typically 2-5 mm apart, the filter will not exhibit polarization independence if the transmission wavelengths of the two points are different. To overcome this problem, each transparent electrode of the filter is divided into two sections and different voltage are applied to the two points through variable resistors so that the transmission wavelengths of the two points are made equal, thus achieving polarization independence.

Another polarization independent photodetector according to the present invention comprises a tunable liquid crystal wavelength-selective filter, and a λ/4 plate and a mirror attached to the input side of the filter. A light beam is incident onto the filter at an angle (typically within 3 degrees). The light beam whose polarization direction is parallel to liquid crystal molecules, and whose wavelength is equal to the resonant wavelength, passes the filter. In contrast, the light beam whose polarization direction is perpendicular to the liquid crystal molecules, or whose wavelength is different from the resonant wavelength, is reflected. The polarization direction of the reflected light is rotated twice by the λ/4 plate and the mirror so that the polarization direction becomes parallel to the liquid crystal molecules, and this light then becomes incident again onto the filter. The light beam whose wavelength is equal to the resonant wavelength passes the filter. The two beams are mixed by the lens. Thus, the filter becomes polarization independent. The two beams are usually separated less than 1 mm apart, and hence, the transmission wavelengths of the two beams are identical.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 4A:
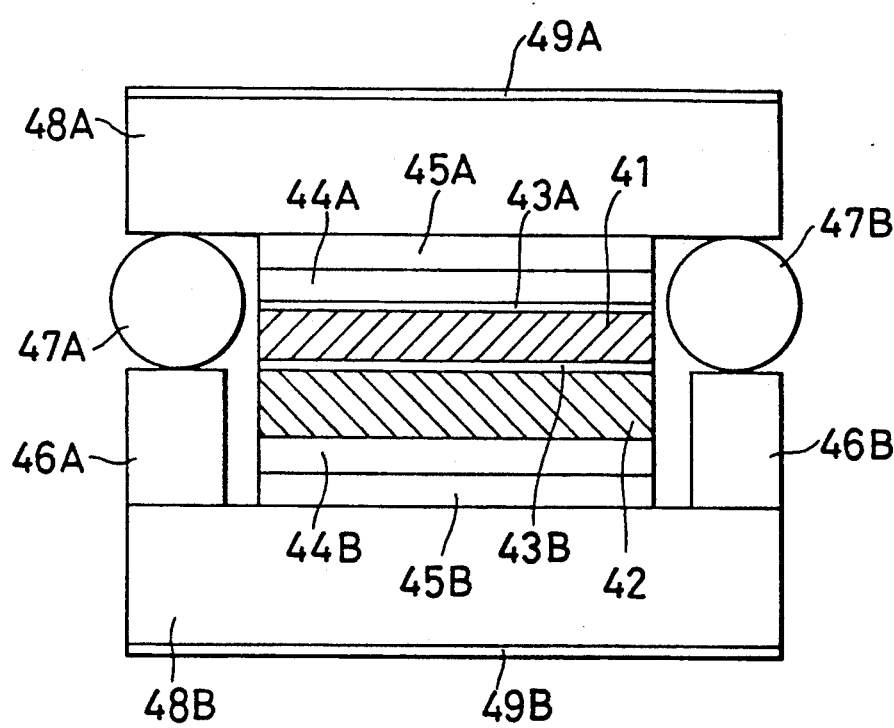
FIG. 4A is a cross-sectional view showing a first embodiment of a tunable liquid crystal wavelength-selective filter according to the present invention.
Figure 4B:
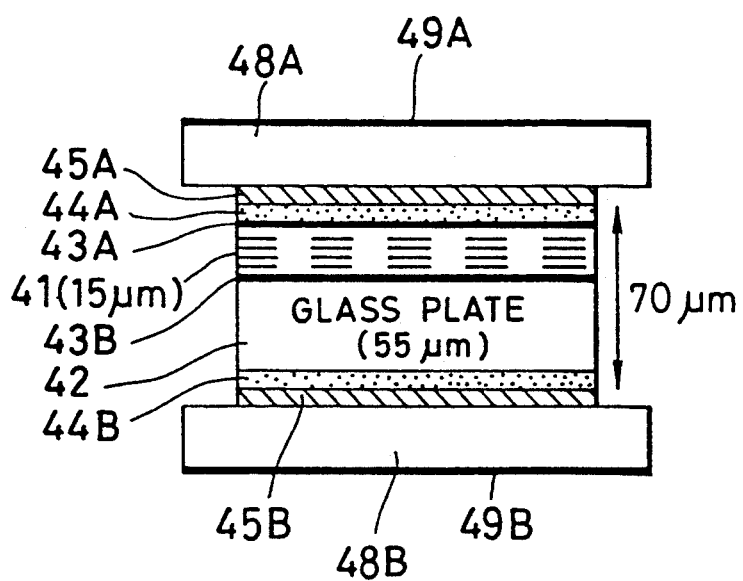
FIG. 4B is a cross-sectional view showing a major portion of the tunable liquid crystal wavelength-selective filter of FIG. 4A.

FIG. 4A is a cross-sectional view showing a first embodiment of a tunable wavelength-selective filter according to the present invention, and FIG. 4B is a schematic view showing a major portion of the filter.

In these figures, reference numeral 41 designates a homogeneously aligned nematic liquid crystal layer; 42 designates a glass plate as a transparent material layer whose refractive index is substantially equal to that of liquid crystal in the liquid crystal layer 41; 43A and 43B designate liquid crystal alignment layers; 44A and 44B designate highly reflective dielectric mirrors; 45A and 45B designate indium tin oxide (ITO) transparent electrode layers; 46A and 46B designate glass plate spacers; 47A and 47B designate spacers; 48A and 48B designate glass substrates; and 49A and 49B designate antireflection (AR) coatings.

Here, the layers 45B, 44B, 42, 43B, 41, 43A, 44A, 45A AND 48A are arranged on the substrate 48B in this sequence. Further, the surfaces of the substrates 48A and 48B are covered with antireflection coatings 49A and 49B. The distance between the two substrates 48A and 48B is determined by the glass plate spacers 46A and 46B, and the spacers 47A and 47B.

Generally, the characteristics of a normal type etalon can be expressed by the following equations when the etalon includes in its cavity a material causing absorption and scattering.

$$T = Tmax/\{1 + F\sin^2(2\pi mL/\lambda)\} \quad (1)$$

$$Tmax = \{(1-R)^2 \cdot \exp(-\alpha L)\}/\{1 - R \cdot \exp(-\alpha L)\}^2 \quad (2)$$

$$F = 4R \cdot \exp(-\alpha L)/\{1 - R \cdot \exp(-\alpha L)\}^2 \quad (3)$$

$$\text{finesse} = \pi\sqrt{F}/2 \quad (4)$$

$$FWHM = 2\lambda 0/K\pi F \quad (5)$$

where T is the transmittance of the etalon, Tmax is the maximum transmittance of the etalon, FWHM is the full width at half maximum, $\lambda$ is the wavelength of incident light, $\lambda 0$ is the resonance wave length, $\alpha$ is the absorption coefficient of the cavity, L is the cavity gap, R is the reflectivity of the mirrors, K is $2L/\lambda 0$, and m is an integer.

On the other hand, the characteristics of a two layer cavity structure etalon including the liquid crystal layer 41 and the glass plate 42 in its cavity as shown in FIG. 4A can be expressed as follows when the absorption and scattering of the glass plate 42 is zero.

$$T = Tmax/\{1 + F\sin^2(2\pi mL/\lambda)\} \quad (6)$$

$$Tmax = \{(1-R)^2 B \cdot \exp(-\alpha L)/\{1 - R \cdot B \cdot \exp(-\alpha L)\}^2 \quad (7)$$

$$F = 4R \cdot B \cdot \exp(-\alpha L)/\{1 - R \cdot B \cdot \exp(-\alpha L)\}^2 \quad (8)$$

$$\text{finesse} = \pi\sqrt{F}/2 \quad (9)$$

$$FWHM = 2\lambda 0 K\pi F \quad (10)$$

$$B = 4n1 \cdot n2/(n1 + n2)^2 \quad (11)$$

where n1 and n2 are the refractive indices of the liquid crystal layer 41 and the glass plate 42, respectively, and B is the reflective loss caused by the refractive index difference between the two layers 41 and 42.

Figure 5:
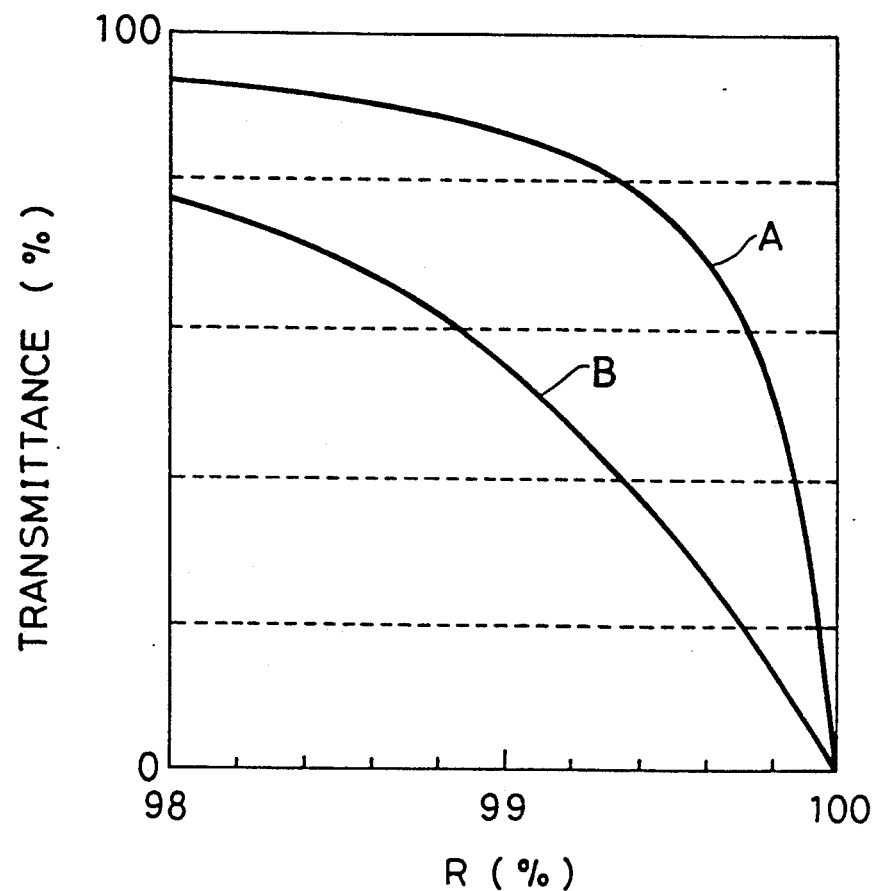
FIG. 5 is a graph illustrating how the transmittance of the tunable liquid crystal wavelength-selective filter as shown in FIG. 4A depends on mirror reflectivity.
Figure 6:
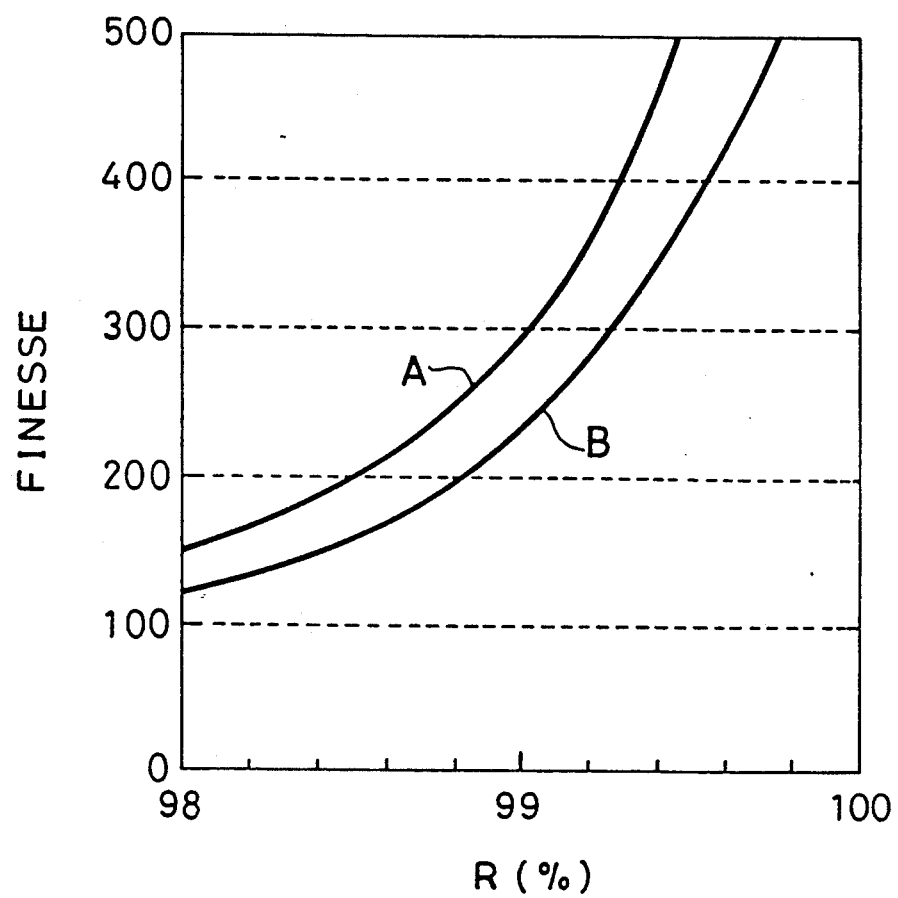
FIG. 6 is a graph illustrating how the finesse of the tunable liquid crystal wavelength-selective filter as shown in FIG. 4A depends on mirror reflectivity.
Figure 7:
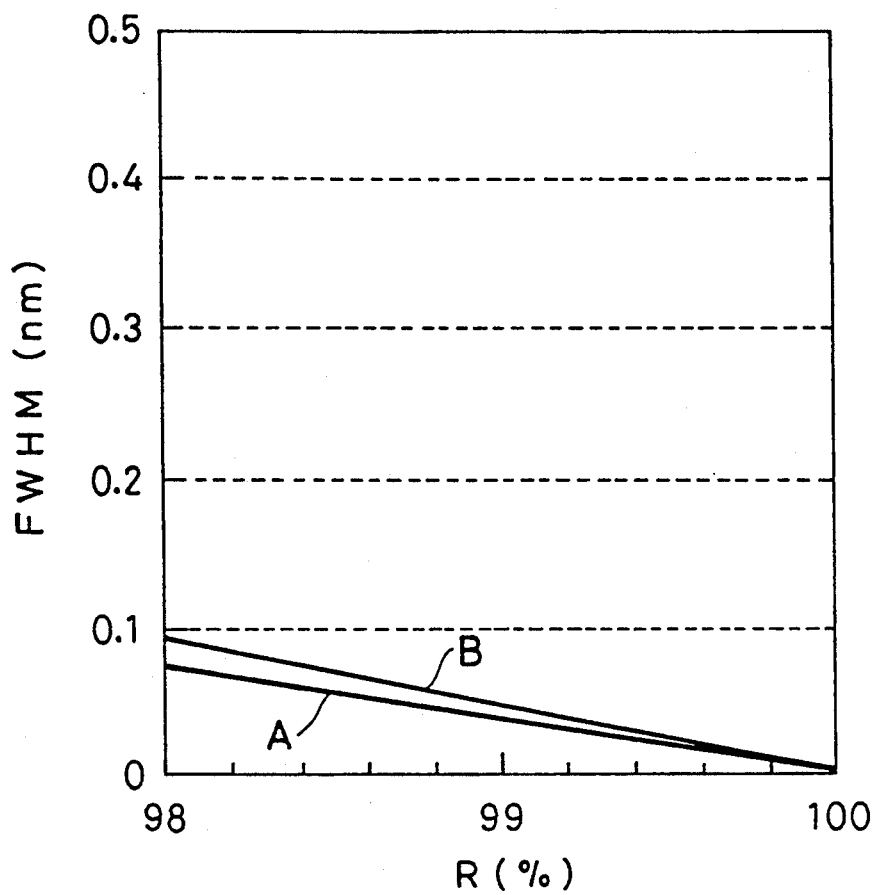
FIG. 7 is a graph illustrating how the full width at half maximum (FWHM) of the transmission peak of the tunable liquid crystal wavelength-selective filter as shown in FIG. 4A depends on mirror reflectivity.

Assuming that the cavity gap is 70 μm, the thickness of the liquid crystal layer 41 is 15 μm, and the thickness of the glass plate 42 is 55 μm as shown in FIG. 4B, and that the refractive index of the liquid crystal layer 41 is 1.5296, and the refractive index of the glass plate 42 is 1.50563 (BK7 glass), the mirror reflectivity dependence of the transmittance, the finesse and FWHM becomes as illustrated in FIGS. 5–7. FIGS. 5–7 also show the characteristics of the conventional one layer cavity liquid crystal device including a liquid crystal layer 70 μm thick. A curve A indicates the characteristics of the two layer cavity structure device according to the present invention, and a curve B indicates the characteristics of the conventional one layer cavity device.

As seen from FIGS. 5–7, the present embodiment can realize a FWHM of less than 0.05 nm, and a transmittance of greater than 80% by using the two layer cavity structure and mirrors whose reflectivity is around 99%. The tunable range is about 10 nm, and hence, can satisfy the requirements of frequency division multiplexing. In contrast, the conventional device having a 70 μm thick cavity completely filled with liquid crystal cannot satisfy the requirements of wavelength division multiplexing because the transmittance falls below 50% when mirrors are used whose reflectivity is around 99%, although the FWHM becomes 0.05 nm. In addition, the 70 μm thick liquid layer will increase the response time to a few seconds to several tens of seconds, though this is not shown in the figures. In contrast, the two layer cavity structure filter has a high speed response time of about several tens of milliseconds.

Next, the optimum relationship between the thickness d1 of the liquid crystal layer 41 and the thickness d2 of the glass plate (or an organic polymer layer) 42 will be described. In the explanation below, ne is the extraordinary index of the liquid crystal, and no is the ordinary index thereof.

The wavelength $\lambda m$ of the transmission peak is given by $$\lambda m = \frac{2ne(d1 + d2)}{m} \quad (12)$$

and the free spectral range (FSRz) is given as $$\lambda m - \lambda m + 1 = 2ne(d1 + d2)/m(m+1) \quad (13)$$

The tunable range of the wavelength by voltage application is given by the following approximation:

$$\Delta\lambda \approx \frac{2\Delta n d1}{m} \times 0.75 \quad (14)$$

where $\Delta n = ne - no$ is the refractive index difference of the liquid crystal.

Therefore, the optimum condition is achieved when the free spectral range is equal to the shift range, and is expressed as follows:

$$1.5\, d1(ne-no) = 2ne(d1+d2)/(m+1) \quad (15)$$

$$d2/d1 = A = 0.75\,(ne-no)\,(m+1)/ne - 1 \quad (16)$$

Here, since the value m is sufficiently larger than 1, $$d2/d1 \approx 0.75(ne-no)m/ne - 1 \quad (16)'$$

For example, when $\Delta n = 0.07$, $ne = 1.5$, $\lambda = 1.5$ μm and $d1 + d2 = 70$ μm, the optimum values are $m = 140$, $d1 = 14$ μm, and $d2 = 56$ μm, and the free spectral range becomes 10 nm. The ratio d2/d1, however, need not be exactly A, and it is enough if it falls from 0.8A to 1.2A inclusive.

On the basis of the above calculations, the tunable wavelength-selective filter as shown in FIG. 4A was fabricated as follows:

First, the bottom surfaces of the synthetic silica glass substrates 48A and 48B, whose surface flatness was $\lambda/20$, were coated with the antireflection coatings 49A and 49B, respectively. Then, indium tin oxide (ITO) layers 10-40 nm thick were formed on the top surfaces of the glass substrates 48A and 48B to provide the transparent electrode layers 45A and 45B, followed by the formation of dielectric mirrors 44A and 44B having 99% reflectivity on the respective transparent electrodes 45A and 45B.

Subsequently, to provide the glass plate 42, a 55 μm thick BK7 glass plate whose surface flatness was $\lambda/20$ was attached to the mirror surface of the dielectric mirror 44B with an adhesive whose refractive index was substantially equal to that of the BK7 glass. Then, a pair of BK7 glass plates of the same thickness were attached to the two edges of the glass substrate 48B as the glass plate spacers 46A and 46B. In this case, the thickness of the adhesive portion was less than 1 μm.

After that, the alignment layers 43A and 43B for the liquid crystal were formed on the dielectric mirror 44A and the glass plate 42 by using a spinner, and were rubbed so that the opposite surfaces were made antiparallel. The alignment layers 43A and 43B were 60 nm thick.

Subsequently, the spherical spacers 47A and 47B, whose diameters were 15 μm, and which were used for liquid crystal spacers, were bonded to both ends of the glass substrate 48A with an adhesive. After that, the glass substrate 48A on which the layers 45A, 44A and 43A were disposed, and the glass substrate 48B on which the layers 45B, 44B, 43 and 43B were disposed, were bonded via the glass plate spacers 46A and 46B so that the two glass substrates 48A and 48B became parallel. This process was carried out by observing the interference fringes so as to precisely adjust the two glass substrates parallely, and thus, the two glass substrates 48A and 48B were fixed firmly. Finally, the nematic liquid crystal was filled into the cavity formed between the alignment layers 43A and 43B, thereby forming the liquid crystal layer 41. The thickness of the liquid crystal layer 41 was 15 μm. Although spherical spacers 47A and 47B were used as spacers for the liquid crystal here, they may be replaced with organic polymer films (e.g., Mylar films) or with fibers.

The spectrum of the thus fabricated liquid crystal-etalon type tunable wavelength-selective filter was observed with an optical spectrum analyzer. This observation was carried out by inputting to the filter a light beam produced by a super luminescent diode having a wide emission spectrum centered around a wavelength of 1.52 μm through an optical fiber, a lens and a polarization beam splitter, and by observing the transmitted light with the spectrum analyzer.

Figure 8:
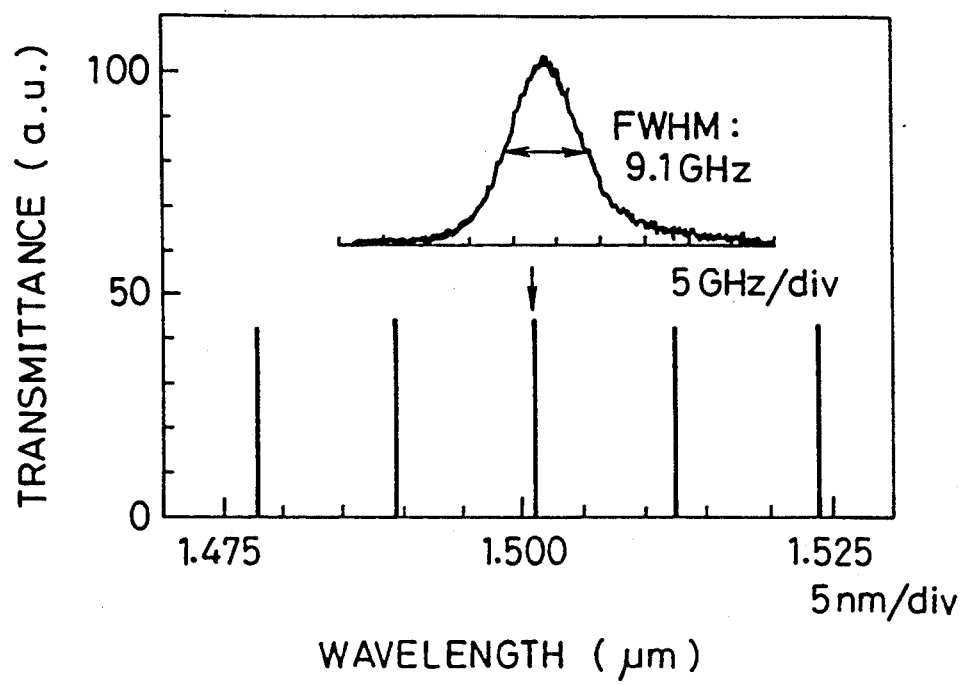
FIG. 8 is a graph illustrating the transmission spectrum of the tunable liquid crystal wavelength-selective filter as shown in FIG. 4A when no voltage is applied to the filter.

FIG. 8 illustrates the transmission spectrum observed: The free spectral range (FSR) around the 1.5 μm wavelength was approximately 12 nm, the FWHM of the transmission peak was 9.1 GHz or 0.07 nm, the loss was 4 dB, and the response speed was 10 msec. Comparing those values with the corresponding values 10 nm, 0.1 nm, 10 dB and a few tens of seconds for the conventional tunable liquid crystal wavelength-selective filter shows that a considerable improvement is achieved.

Figure 9:
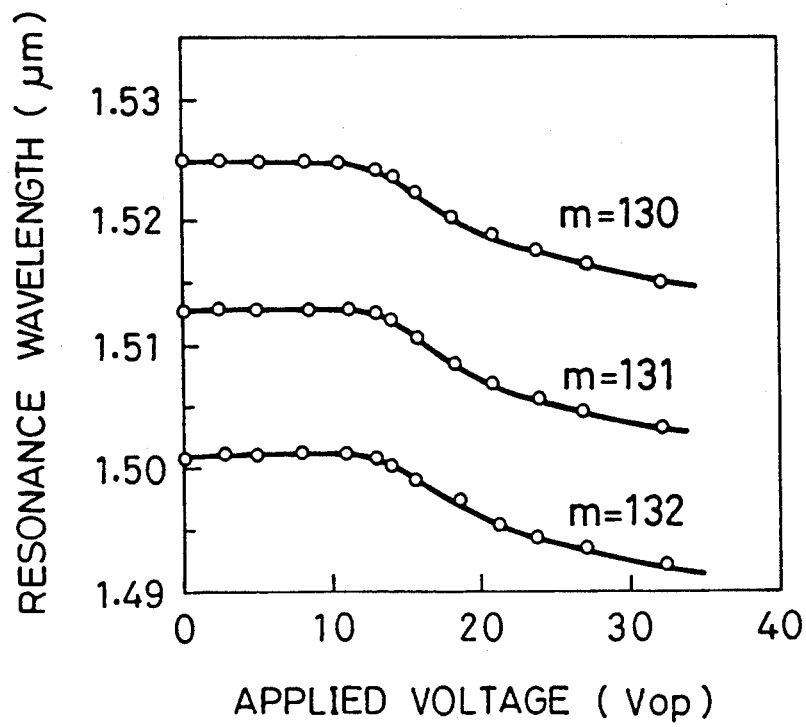
FIG. 9 is a diagram illustrating the shift behavior of the transmission peak wavelengths of the tunable liquid crystal wavelength-selective filter as shown in FIG. 4A when various voltages are applied.

FIG. 9 illustrates the peak wavelength shift behavior of the tunable wavelength-selective filter when a voltage is applied to the liquid crystal layer 41. The peak wavelength is shifted about 12 nm by applying 30 volts to the liquid crystal layer. The FWHM and the transmittance were not affected by the voltage application.

Thus, the tunable wavelength-selective filter of the present invention has narrower FWHM and higher transmittance than those of the conventional liquid-crystal-etalon type tunable wavelength-selective filter, and hence, is preferably applicable to FDM communications.

Incidentally, although in the present embodiment, a nematic liquid crystal is employed as the liquid crystal layer 41, the liquid crystal layer of the present invention is not restricted to nematic liquid crystal material alone, and any type of liquid-crystal can be used.

In addition, although a part of the liquid crystal is replaced by the thin glass plate in this embodiment, any material can be used as an alternative to the glass plate as long as the material is transparent, and has refractive index substantially equal to that of the liquid crystal. We experimented by using a polyimide layer in place of the glass plate. Here, FLUPI-01, which was developed by Nippon Telegraph and Telephone Corporation, was used as the polyimide film (see, Sasaki's article in "Plastic" vol. 42, No. 9, pp. 47-, or Matsumura et al.'s article in "Macromolecule", vol. 24, No. 19, 1991). FLUPI-01 is synthesized from a specific fluorinated diamine including two trifluoromethyl groups and two types of acid anhydrides. The fluorine content of the FLUPI-01 is 31.3%. FLUPI-01 exhibits very high transparency with a loss of 0.3 dB/cm at a 1.3 μm wavelength. Its refractivity is approximately 1.52. A 40 nm thick transparent electrode ITO was formed on a glass substrate coated with an antireflection coating, followed by the formation of a dielectric mirror thereon whose reflectivity was 99%. Subsequently, a 55 μm thick layer of FLUPI-01 was formed on the dielectric mirror with a spinner by using DMAc as solvent, followed by one hour of annealing at 350° C. After that, the filter was arranged in the same manner as the filter using the glass plate. This filter has a free spectral range of about 12 nm around the 1.5 μm wavelength, an FWHM of 0.07 nm, and a transmittance of about 35%.

Thus, using a polyimide film instead of the glass plate as the transparent material layer achieves a similar effect. Although polyimide is used as an organic polymer layer in this embodiment, other organic polymers can achieve a similar effect as long as they have high transmittance.

The polyimide layer can be formed on the substrate by spin coating instead of bonding as the glass plate, which facilitates fabrication.

EMBODIMENT 2

A second embodiment of the tunable wavelength-selective filter according to the present invention will no be described with reference to FIGS. 10–13.

Figure 10:
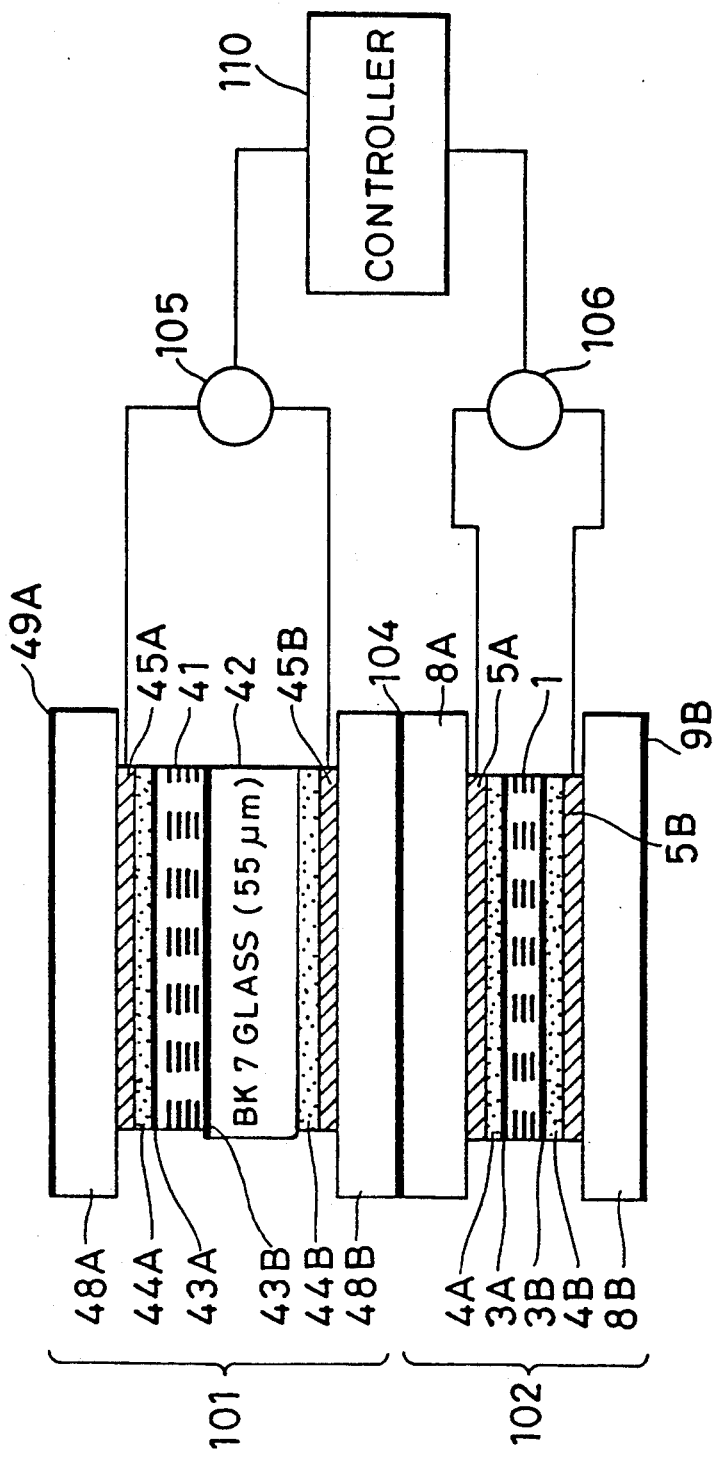
FIG. 10 is a cross-sectional view showing a second embodiment of a tunable liquid crystal wavelength-selective filter according to the present invention.

FIG. 10 shows an arrangement of the second embodiment. Basically, the second embodiment has a double cavity structure in which a tunable liquid crystal wavelength-selective filter 101 having the two layer cavity structure of the first embodiment is stacked on a normal type tunable liquid crystal wavelength-selective filter 102. The cavity length of the liquid crystal filter 101 is five times longer than that of the liquid crystal filter 102. The filters 101 and 102 are slightly (less than one degree) inclined so that they do not interfere each other.

In FIG. 10, reference numeral 104 designates an adhesive bonding two glass plates 8A and 48B with little loss. The refractive index of the adhesive is substantially equal to that of the glass plates. Reference numerals 105 and 106 denote voltage sources for driving each liquid crystal of the two filters 101 and 102, and 110 denotes a controller determining the voltages of the voltage sources 105 and 106.

Figure 11:
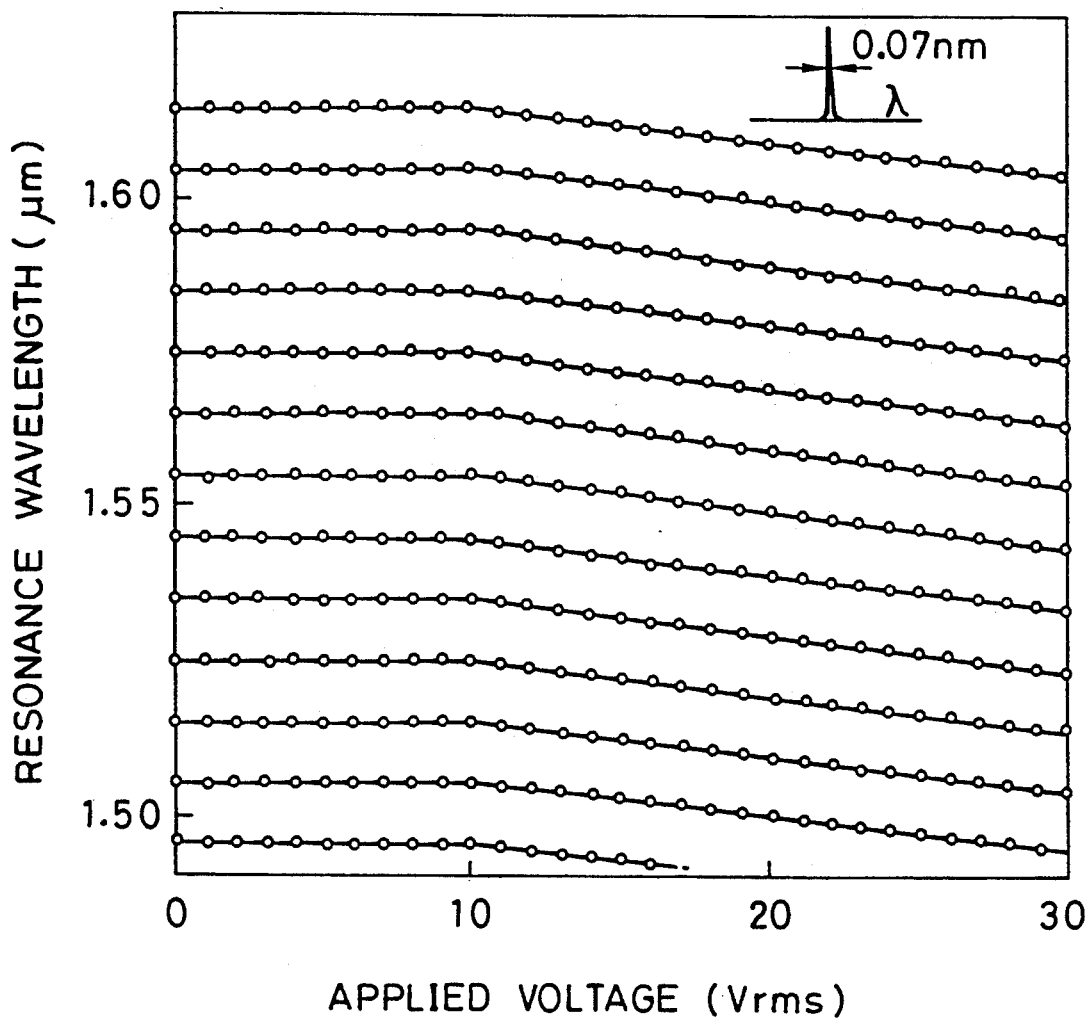
FIG. 11 is a graph illustrating how the resonant wavelength of the tunable liquid crystal wavelength-selective filter 101 having a two layer cavity structure depends on the applied voltage.
Figure 12:
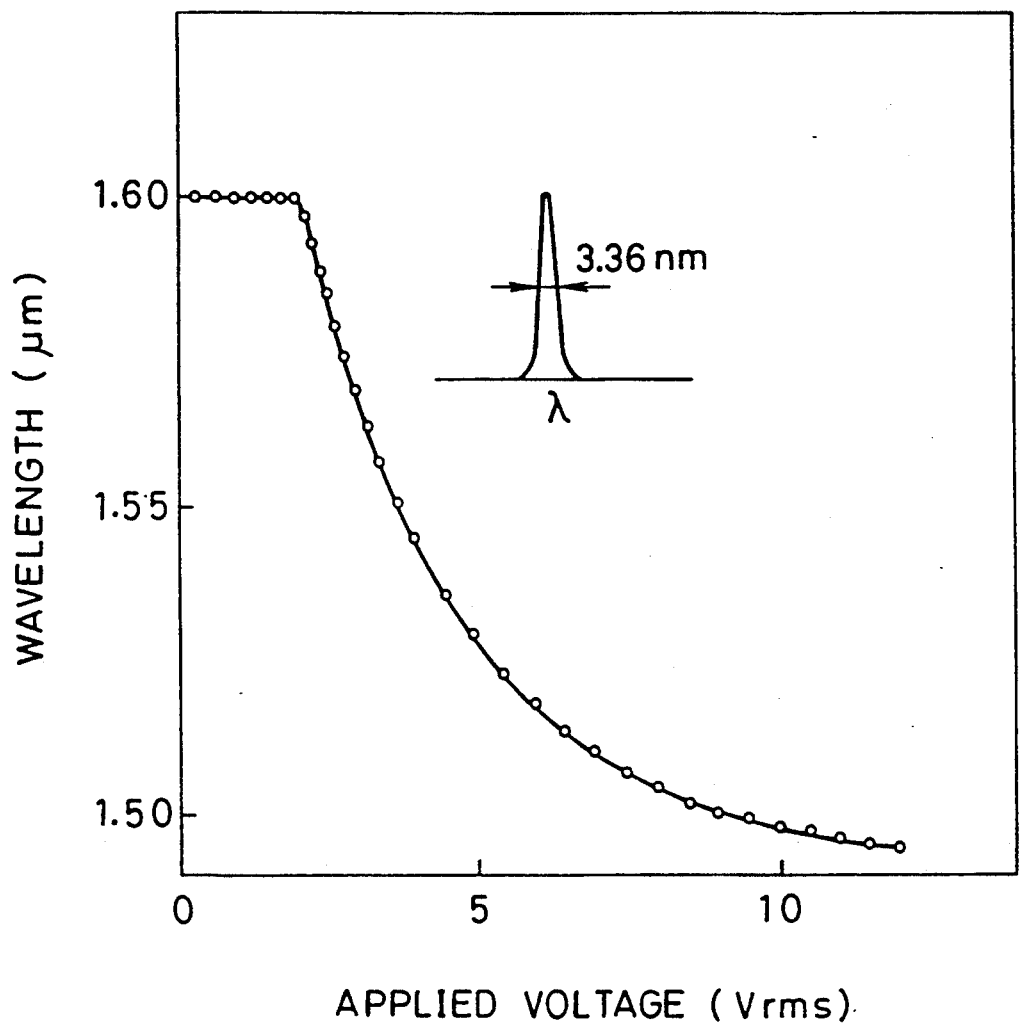
FIG. 12 is a graph illustrating how the resonant wavelength of the normal type tunable liquid crystal wavelength-selective filter 102 depends on the applied voltage.

FIGS. 11 and 12 illustrate the voltage dependence of the resonant wavelength of the two layer cavity structure tunable liquid crystal wavelength-selective filter 101, and that of the normal type tunable liquid crystal wavelength-selective filter 102, respectively. Table 2 illustrates the characteristics of the first filter 101 and the second filter 102. The first narrow bandwidth filter 101 has a narrow bandwidth of 9 GHz or 0.07 nm, a narrow tunable range of 12 nm, and low transmittance of 35%, whereas the second wide tunable range filter 102 has a wide bandwidth of 3.36 nm, a broad tunable range of 127 nm, and a high transmittance of 92%. Ten peaks of the first filter 101 are accommodated between the two adjacent peaks of the second filter 102. Thus, several peaks are first selected by the second filter 102 in a comb fashion, and then one of them is selected by the first filter 101. More specifically, by varying the peak wavelength of the wide tunable range filter 102 from 1.6 μm to 1.47 μm by changing the applied voltage, and by matching the peak of the narrow bandwidth filter 101 with one of the peaks of the filter 102 by adjusting the applied voltage, a peak whose bandwidth is 8.4 GHz or 0.067 nm can be shifted from 1.6 μm to 1.47 μm.

TABLE 2

CHARACTERISTICS OF NARROW BANDWIDTH FILTER 101, WIDE TUNABLE RANGE FILTER 102 AND THE DOUBLE CAVITY STRUCTURE FILTER OF FIG. 10

| TYPE | BAND-WIDTH | TUN-ABLE RANGE | TRANS-MIT-TANCE | REFLEC-TIVITY OF MIRRORS | GAP |
|---|---|---|---|---|---|
| 1 | 0.07 nm | 12 nm | 35% | 99% | 15 μm |
| 2 | 3.36 nm | 127 nm | 92% | 93% | 6 μm |
| 3 | 0.067 nm | 127 nm | 30% | | |

NOTES:
type 1: narrow bandwidth first filter 101 having two layer cavity structure as shown in FIG. 4A
type 2: wide tunable range second filter 102 having normal structure
type 3: double cavity filter of FIG. 10

Figure 13:
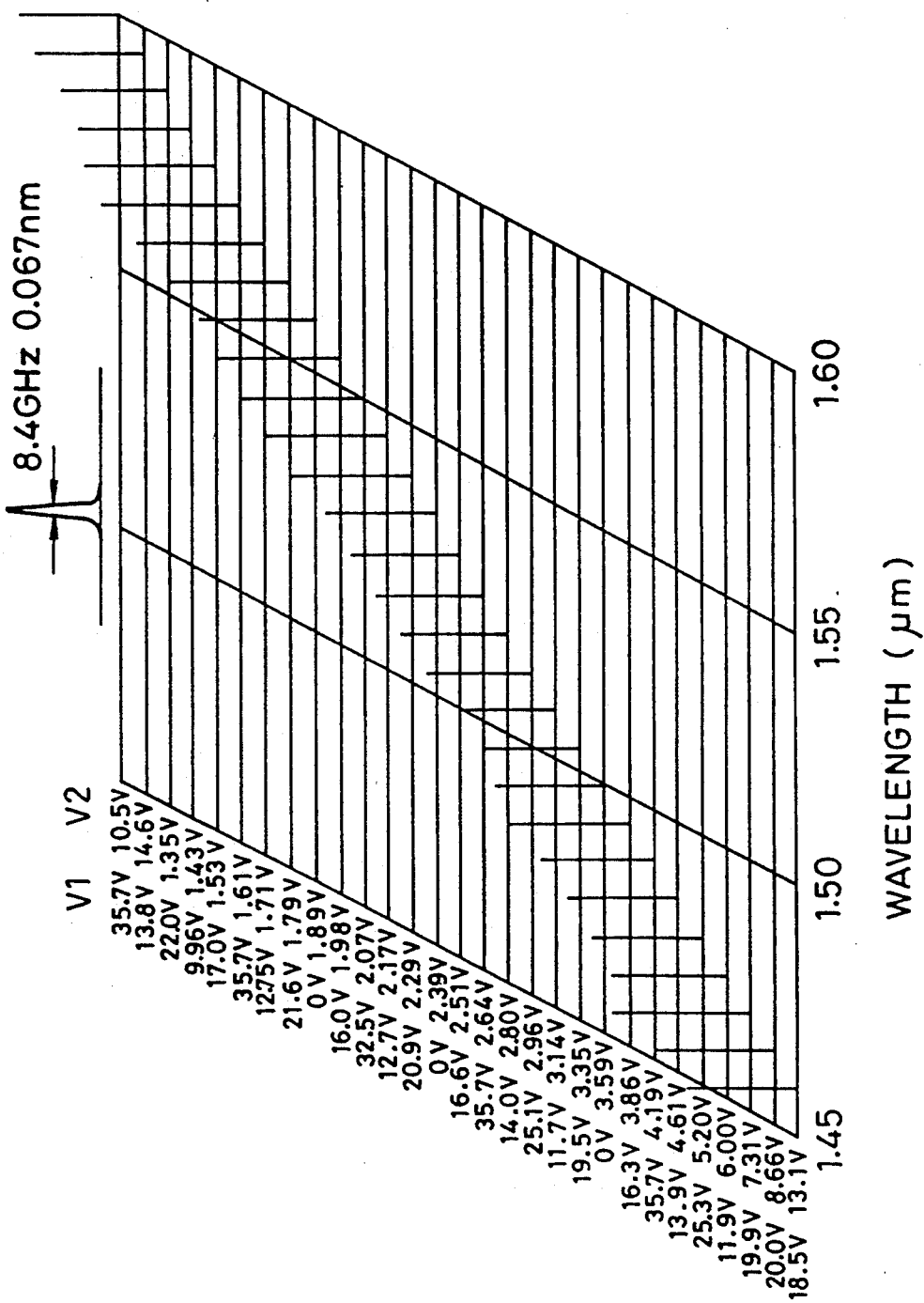
FIG. 13 is a diagram illustrating wavelength selection of the tunable liquid crystal wavelength-selective filter as shown in FIG. 10.

As a result, as shown in FIG. 13, it was confirmed that a peak whose bandwidth is 8.4 GHz (0.067 nm) shifts by 127 nm. The transmittance was about 30%. Each peak selected is spaced 5 nm apart in this figure.

Two laser light signals, which were spaced 25 GHz (0.2 nm) apart, and which were modulated by a 100 MHz waveform and a 500 MHz waveform, were mixed by a coupler, and one of them was selected by the tunable liquid crystal wavelength-selective filter of this embodiment. One of them was selected with a 15 dB extinction ratio. From this, it was found that any one wavelength can be selected from about 600 wavelengths (that is, about 127/0.2) by the filter of this embodiment, which is far superior to the conventional filter which can select only one wavelength from about 50 wavelengths.

Next, a polarization independent photodetector employing the tunable liquid crystal wavelength-selective filter of the first embodiment will be described. In this filter, the refractive index of the liquid crystal layer varies when a voltage of a few volts is applied to the liquid crystal layer because this inclines the liquid crystal molecules. As a result, the optical length between the mirrors changes, and hence, the transmission peak wavelength varies, thereby achieving the function of a tunable wavelength-selective filter as described before.

This filter, however, has this effect only on a light signal whose polarization direction is parallel to the liquid crystal molecules, and not on a light signal whose polarization direction is perpendicular to the liquid crystal molecules. This means that the filter has polarization dependence. To overcome this problem, examples using a polarization beam separation cell will be described below.

EMBODIMENT 3

Figure 14:
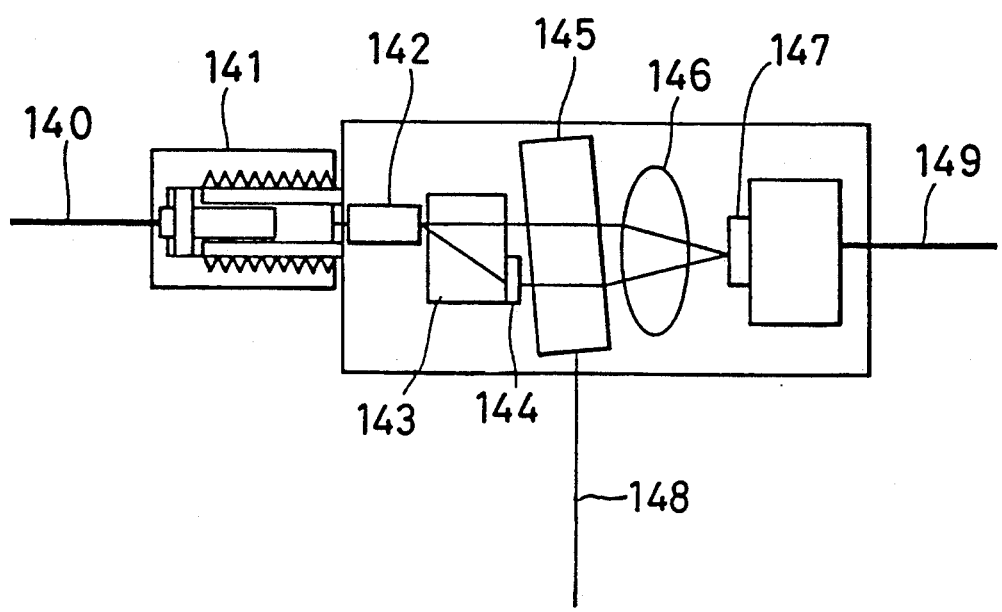
FIG. 14 is a block diagram showing a polarization independent photodetector as a third embodiment of the present invention.

FIG. 14 shows an embodiment of a polarization independent photodetector according to the present invention. In this figure, reference numeral 140 designates an input signal mode optical fiber; 141 designates a fiber connecting portion; 142 designates a grin lens; 143 designates a birefringent prism; 144 designates a λ/2 plate; 145 designates a tunable liquid crystal wavelength-selective filter of homogeneous ordering; 146 designates a lens; 147 designates a detector made up of a PIN photodiode; 148 designates an electric terminal for driving the tunable liquid crystal wavelength-selective filter; and 149 designates an output terminal of the photodetector. As the tunable liquid crystal wavelength-selective filter 145, the two layer cavity structure filter of the first embodiment, or the double cavity structure filter of the second embodiment or the conventional type filter can be used.

Figure 1:
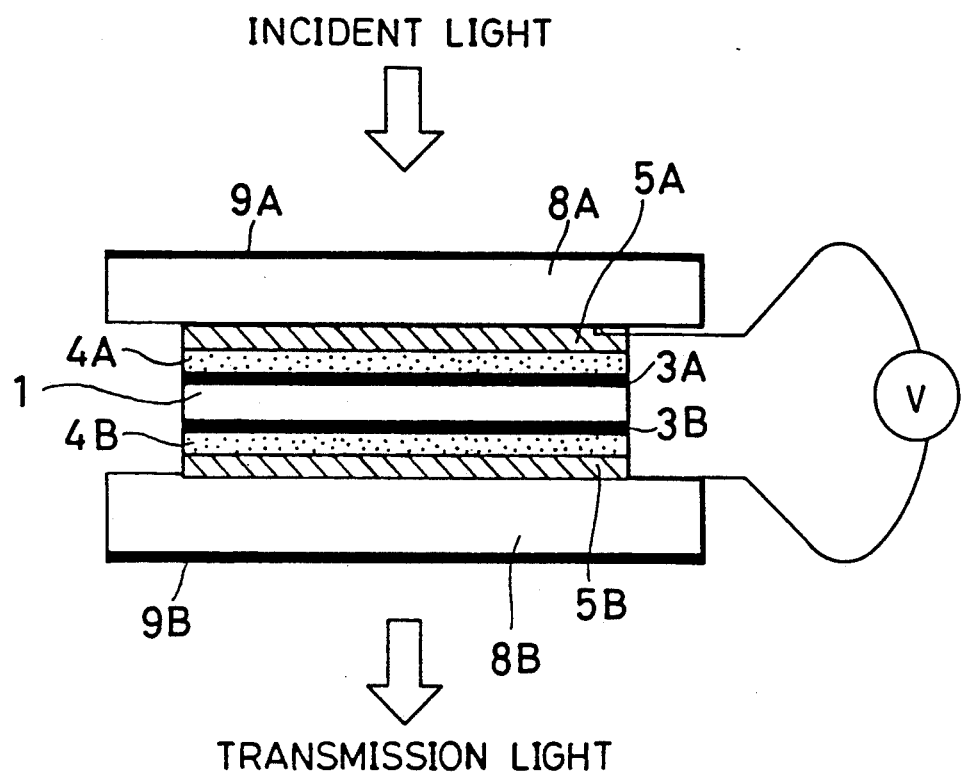
FIG. 1 is a cross-sectional view showing a conventional tunable liquid crystal wavelength-selective filter.
Figure 2:
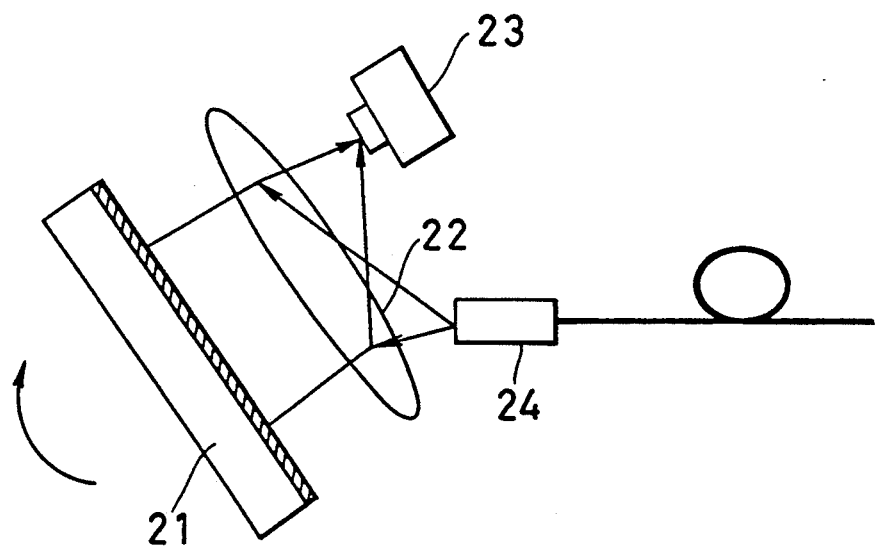
FIG. 2 is a schematic view showing a conventional grating type photodetector.
Figure 3:
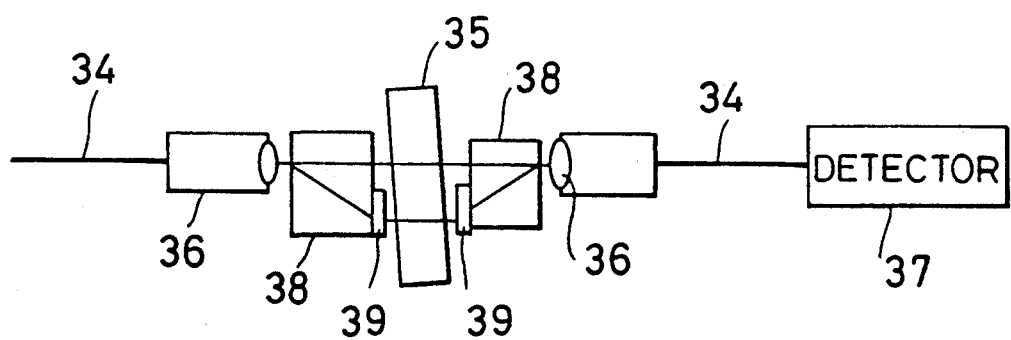
FIG. 3 is a schematic view showing a conventional polarization-independent photodetector employing a tunable liquid crystal wavelength-selective filter.

The ferrule of the input optical fiber 140 is inserted into the detector section along the connecting portion 141. The incident light beam is collimated by the grin lens 142, and the collimated beam is separated by the birefringent prism 143 into two polarized beams whose polarization directions are perpendicular to each other. One of the two beams is directly lead to the tunable liquid crystal wavelength-selective filter 145, whereas the other of them is rotated 90 degrees by the λ/2 plate 144, and then enters the filter 145, which inclines one degree with regard to the normal direction of the incident beam. Thus, although a selected optical signal is transmitted through the filter, the other optical signals are reflected owing to the inclination of one degree, never to return to the input optical fiber 140. The two beams transmitted through the filter 145 are spaced 3 mm apart, and are focused onto the detector 147 through the lens 146 with a spot diameter of 100 μm. The PIN photodetector has a head portion which is 100 μm in diameter. Thus, the alignment becomes much easier than in the conventional device, which has at the output side a single mode optical fiber whose core diameter is about 10 μm. In addition, the output side birefringent prism 38 and λ/2 plate 39 which are needed in the conventional device of FIG. 3 are obviated.

Figure 15:
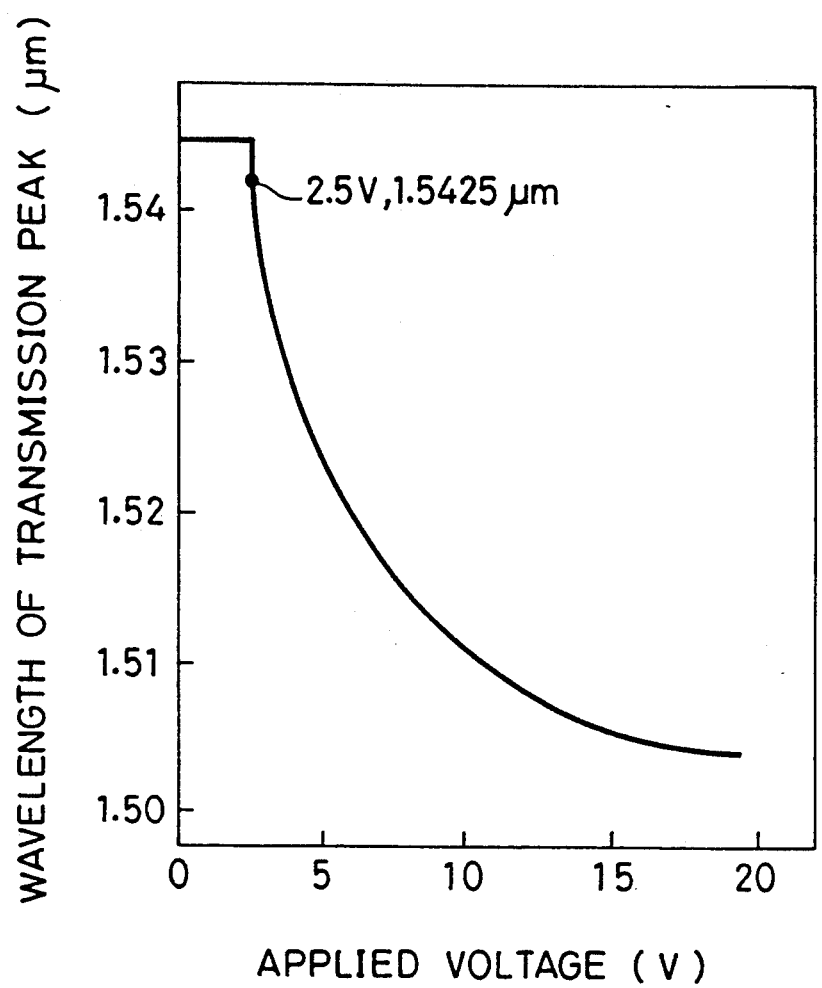
FIG. 15 is a graph illustrating the shift characteristics of the wavelength of the transmission peaks of the tunable liquid crystal wavelength-selective filter used in the third embodiment when the applied voltage is varied.
Figure 16A:
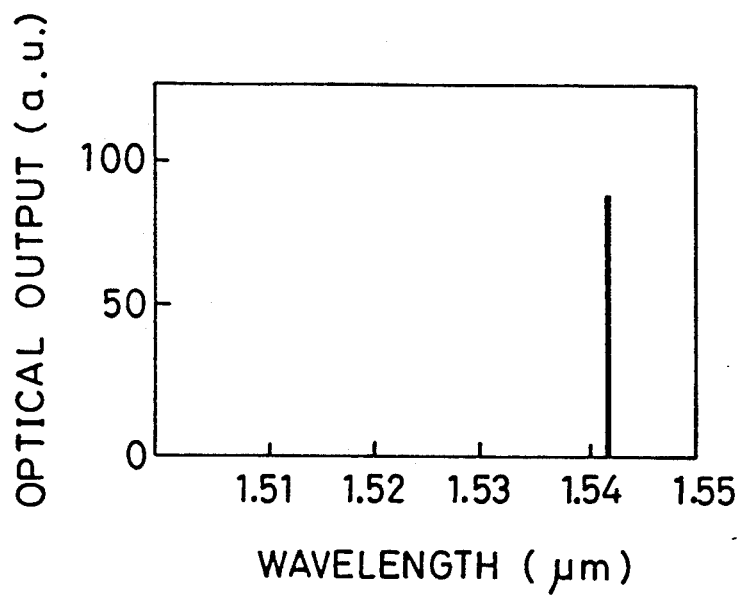
FIG. 16A is a diagram illustrating the output characteristic of a photodetector of the third embodiment.
Figure 16B:
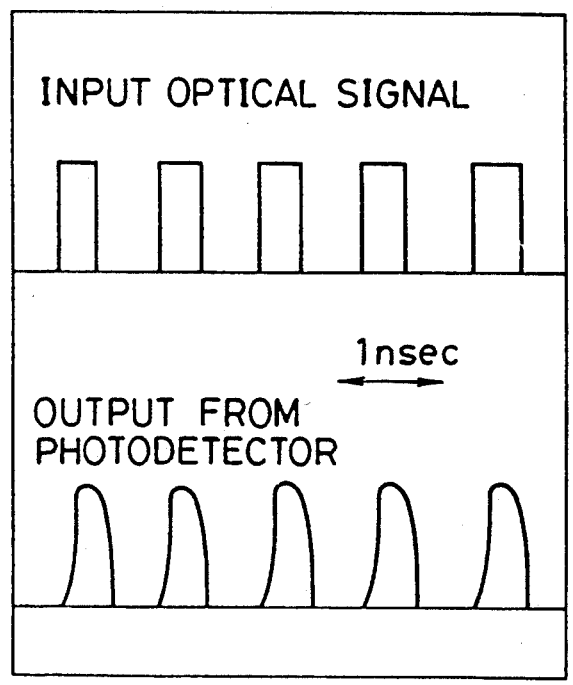
FIG. 16B is a diagram illustrating an input waveform and an output waveform of an optical signal in the third embodiment.

FIG. 15 shows the relationship between the transmission peak wavelength and the applied voltage of the tunable liquid crystal wavelength-selective filter was used as the filter 145. In this measurement, a light beam produced by a DBR laser having a central wavelength at 1.5425 μm was modulated by a 1GHz signal by using an LN (LiNO₃) modulator, was transmitted through a 10 km long fiber, and was detected by the photodetector of this embodiment. The spectrum of the output signal was measured by varying a voltage applied to the tunable liquid crystal wavelength-selective filter 145 of the photodetector. FIG. 16A shows the result: The output beam was obtained when the voltage corresponding to the 1.5425 μm wavelength was applied. The detected output did not change when the polarization state in the fiber was changed, which means that the device is polarization independent. FIG. 16B shows the waveform of the detected output. Although the output is distorted to some extent, the correct 1 GHz signal can be reproduced.

Although the birefringent prism 143 is used as the polarization beam separation cell in this embodiment, other polarization beam separation cells can be used.

Figure 17A:
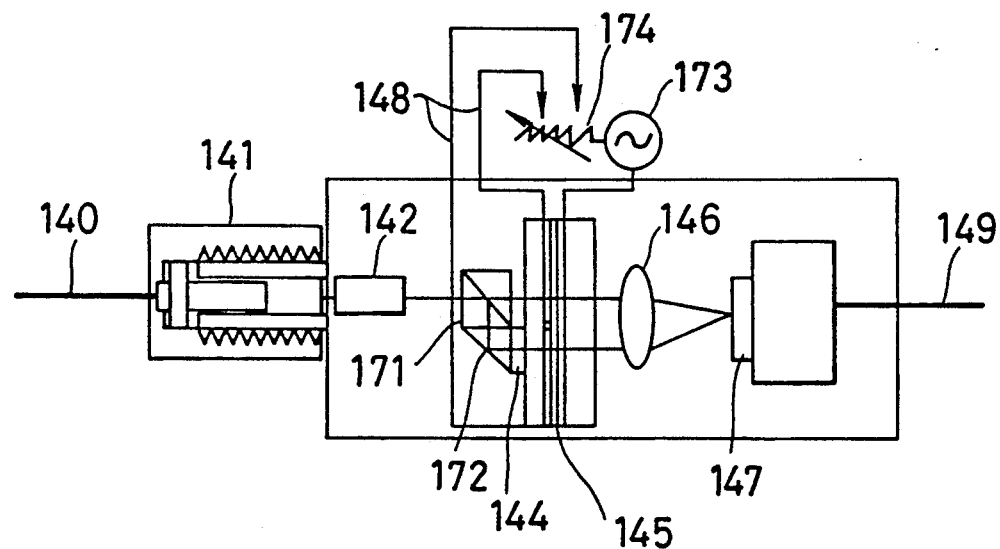
FIG. 17A is a block diagram showing a first variation of the third embodiment as shown in FIG. 14.

FIG. 17A illustrates one example. In this figure, the input beam is separated into two beams by a polarization beam splitter 171 and a prism 172. One of them passes a λ/2 plate 144, and thus, the polarization directions of the two beams are made parallel to the liquid crystal molecules. This arrangement achieves a similar effect to that of the embodiment as shown in FIG. 14.

Figure 17B:
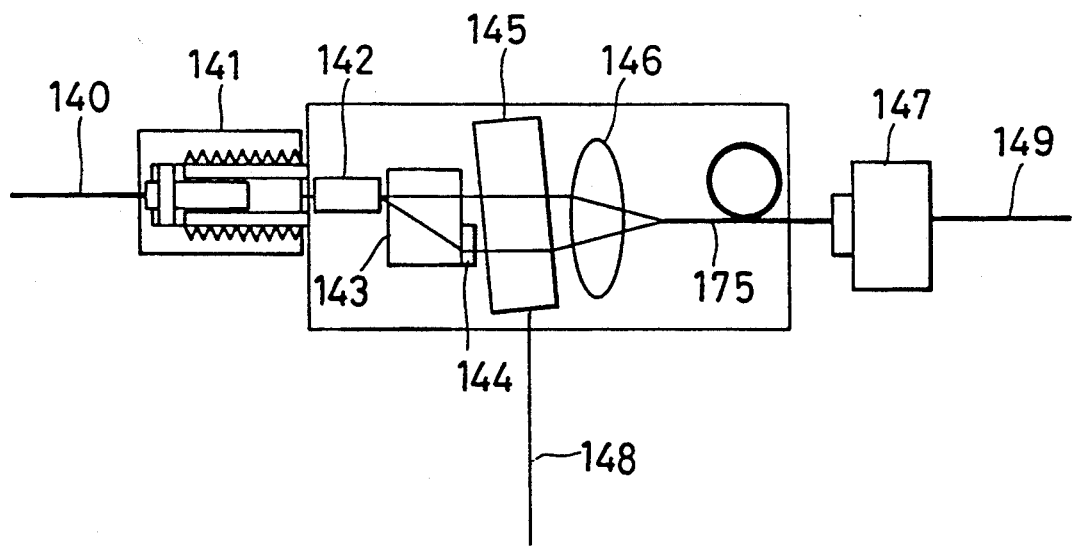
FIG. 17B is a block diagram showing a second variation of the third embodiment as shown in FIG. 14.

FIG. 17B shows another variation of the above embodiment. Although the photodetector of FIG. 14 directly receives the output beam with the detector 147, the photodetector of FIG. 17B receives the output beam with the detector 147 via a multimode fiber 175 whose core diameter is greater than 100 μm. This photodetector can achieve a similar effect to that of FIG. 14.

Figure 18:
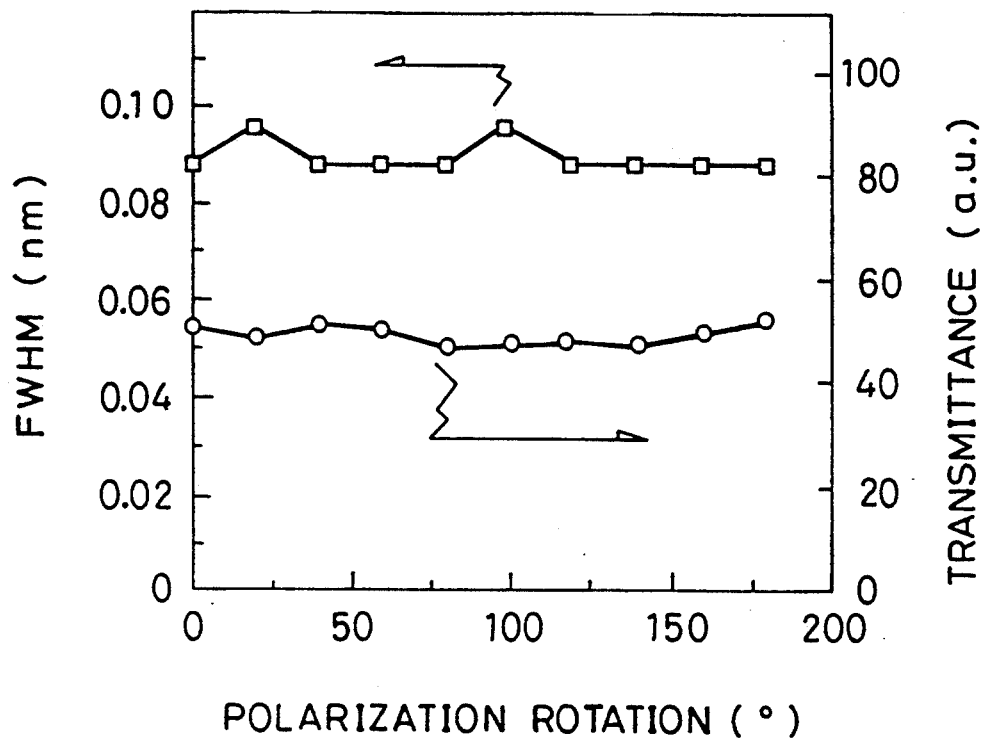
FIG. 18 is a graph illustrating how the polarization independent photodetector as shown in FIG. 17A performs when the polarization is rotated.

Next, the characteristics of the polarization independent photodetector will be explained. The tunable wavelength-selective filter used in the experiment was a narrow bandwidth filter of the first embodiment as shown in FIG. 4A. First, the transmission spectrum was measured by the set up as shown in FIG. 17A where the output beam was transmitted to the detector 147. As a result, two transmission spectra appeared. This corresponds to the fact that the light beams pass two different points in the tunable liquid crystal wavelength-selective filter. Voltages applied to the transparent electrode, which is divided into two parts as shown in FIG. 17A, were adjusted by controlling a variable resistor 174 so that the two transmission peaks agreed. The ratio V1/V2 of the two voltages was 0.98. The detector 147 directly received the output beam, and the output of the detector 147 was measured with rotation of the plane of polarization of the incident beam. FIG. 18 shows the results. The transmittance changes little when the plane of polarization of the incident beam is rotated, which means that polarization independence can be achieved by the arrangement of this embodiment. The total loss of the photodetector was 5 dB, and the loss of the portion other than the tunable liquid crystal wavelength-selective filter 145 was 1 dB. The polarization dependence of the loss was less than 0.5 dB. The filter 145 can be replaced with a conventional tunable liquid crystal wavelength-selective filter or the double cavity liquid crystal filter of the second embodiment.

EMBODIMENT 4

Figure 19:
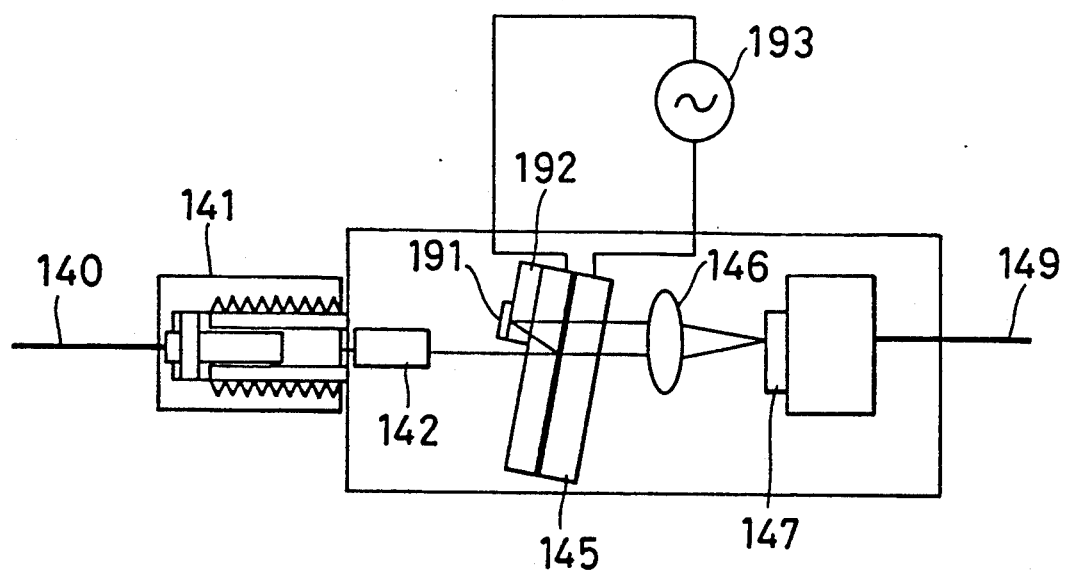
FIG. 19 is a block diagram showing a polarization independent photodetector as a fourth embodiment of the present invention.

FIG. 19 is a block diagram showing another embodiment of the polarization independent photodetector of the present invention. In this figure, reference numeral 191 designates a stripe-like mirror; 192 designates a λ/4 plate; and 193 designates a voltage source for driving the tunable liquid crystal wavelength-selective filter 145.

A light beam incident with some angle (∼1°) onto the tunable liquid crystal wavelength-selective filter 145 passes the filter 145 if its polarization plane is parallel to the liquid crystal molecules and its wavelength is equal to the resonance wavelength of the filter 145. On the other hand, a light beam whose polarization plane is perpendicular to the liquid crystal molecules is reflected by the filter 145. The reflected light is incident onto the λ/4 plate 192, reflected by the mirror 191, transmitted again through the λ/4 plate 192, and incident again onto the tunable liquid crystal wavelength-selective filter 145. In the course of this, the light beam passes through the λ/4 plate 192 twice, which is equivalent to passing through a λ/2 plate. Thus, the polarization plane of the light beam rotates by 90 degrees. As a result, the polarization direction of the light beam becomes parallel to the liquid crystal molecules when the light beam enters the tunable liquid crystal wavelength-selective filter 145 again. Accordingly, the beam passes through the filter 145 without reflection. Thus, the tunable liquid crystal wavelength-selective filter 145 is made polarization independent. The polarization dependence of the loss was less than 0.5 dB. In this case, since the light beam incident again onto the filter 145 is reflected in an oblique direction from the filter 145, the reflected beam does not enter the input optical fiber 140 again.

According to this embodiment, a simple, polarization independent module can be realized by only disposing a collimating lens 142, the λ/4 plate 192 and mirror 191 at the input side, and a lens 146 at the output side. In addition, since a detector 147 of 100 μm in diameter is disposed at the output side, alignment becomes very simple. Further, the detector 147 can be connected via a multimode optical fiber of the same diameter as that of the detector 147, achieving a similar effect.

EMBODIMENT 5

Figure 20:
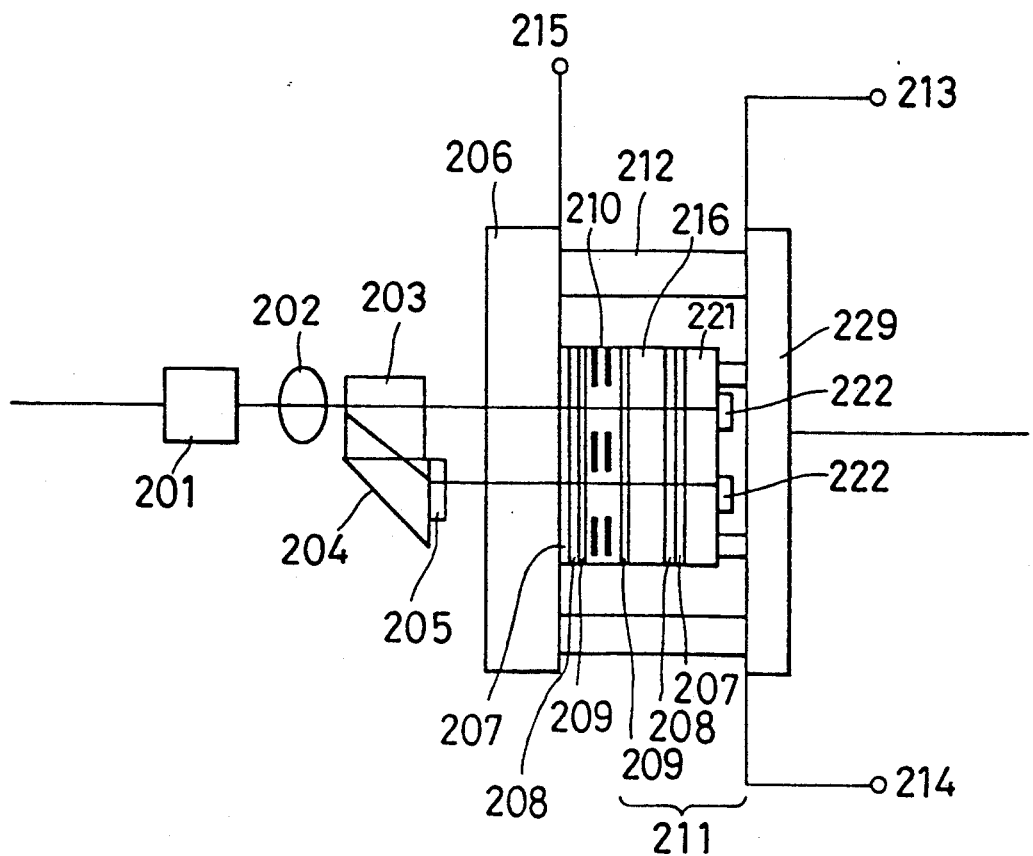
FIG. 20 is a block diagram showing a polarization independent photodetector as a fifth embodiment of the present invention.

FIG. 20 shows still another embodiment of a polarization independent photodetector according to the present invention. In this figure, reference numeral 201 designates a single mode optical fiber; 202 designates a collimating lens; 203 designates a polarization beam splitter; 204 designates a prism; 205 designates a λ/2 plate; 206 designates a glass substrate; 207 designates transparent electrodes; 208 designates dielectric mirrors; 209 designates alignment layers for the liquid crystal; 210 designates the liquid crystal; 211 designates a photodetector part; 212 designates spacers; 213 designates a ground terminal; 214 designates a detector output terminal; 215 designates a terminal for driving the liquid crystal filter; and 216 designates a transparent glass plate.

Figure 21A:
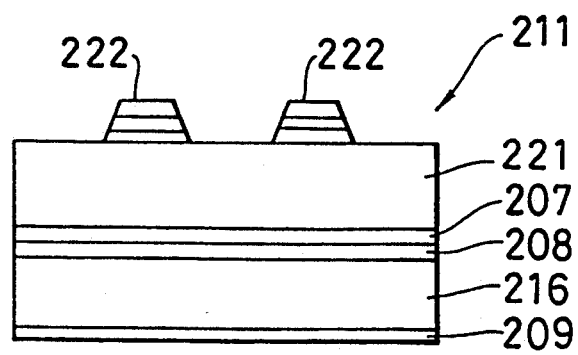
FIG. 21A is a cross-sectional view of a photodetecting portion of the fifth embodiment.
Figure 21B:
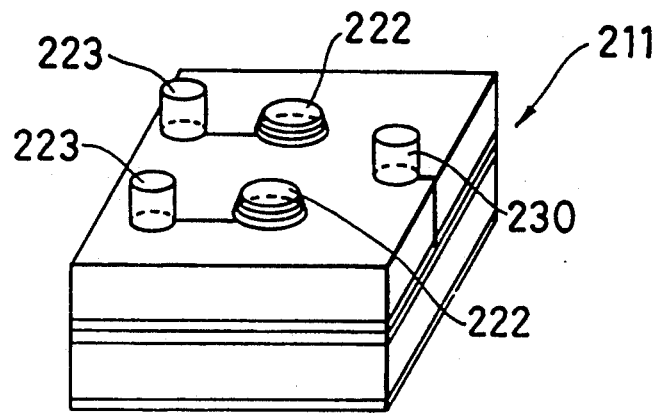
FIG. 21B and 21C are perspective views of the photodetecting portion of the fifth embodiment.

FIGS. 21A and 21B shows the photodetector part 211 in more detail. FIG. 21A is a cross-sectional view of the photodetector part 211, which comprises two GaInAs PIN photodiodes 222 on a semi-insulating InP substrate 221. Reference numeral 207 denotes a transparent electrode; 208 designates a dielectric mirror; 216 designates a transparent glass plate; and 209 designates an alignment layer for the liquid crystal. FIG. 21B is a perspective view of the photodetector 211. In this figure, reference numeral 223 denotes flip chip bumps connected to the photodiodes 222, and 230 denotes a flip chip bump for supplying voltage to the ITO (a ground state).

Figure 21C:
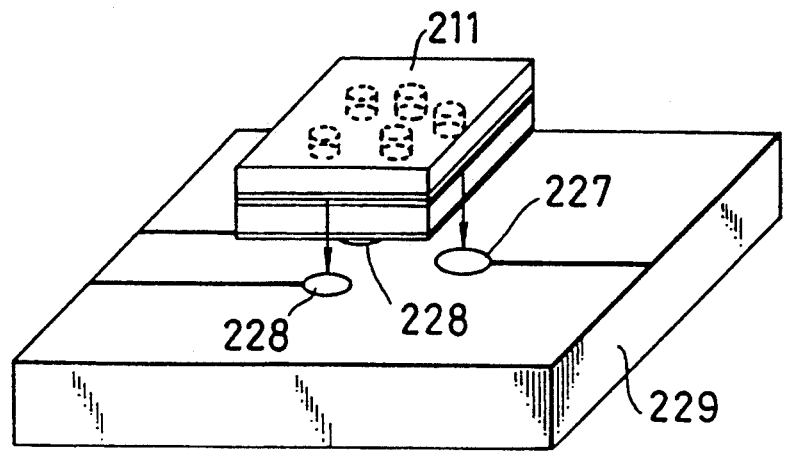

As shown in FIG. 21C, a ground electrode 227 and detector output electrodes 228 are patterned on a glass substrate 229, and are connected to the bumps. The glass substrate 229 and the glass substrate 206, on which the dielectric mirrors 208 and liquid crystal alignment layers 209 are formed, are bonded via the spacers 212 to form a Fabry-Perot etalon which includes a cavity retaining liquid crystal at the bottom side of the photodetectors 222. Thus, beams passing the Fabry-Perot etalon are incident onto the bottoms of the PIN photodiodes 222 constituting the photodetector part 211. The two polarized beams perpendicular to each other are incident onto the bottoms of the two PIN photodiodes 222, and the outputs of the diodes are connected in parallel so that the device of FIG. 20 functions as a polarization independent detector.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An electrically tunable wavelength-selective filter, comprising:
   a first glass substrate;
   a first transparent electrode layer;
   a first highly reflective mirror;
   a first alignment layer;
   a liquid crystal layer;
   a second alignment layer;
   a transparent material layer whose refractive index is substantially equal to that of the liquid crystal of said liquid crystal layer;
   a second highly reflective mirror;
   a second transparent electrode layer; and
   a second glass substrate;
   which are arranged in this sequence,
   wherein said first and second highly reflective mirrors define an etalon cavity having an optical length and said transparent material layer is present to increase the optical length of the etalon cavity.

2. An electrically tunable wavelength-selective filter as claimed in claim 1, wherein said transparent material layer is a glass plate.

3. An electrically tunable wavelength-selective filter as claimed in claim 2, wherein said liquid crystal layer has an ordinary refractive index and an extraordinary refractive index, wherein said liquid crystal layer has a thickness d1, wherein said glass plate has a thickness d2, and wherein the ratio d2/d1 of the thicknesses falls in a range from 0.8A to 1.2A inclusive, where $A = 0.75 \ (ne-no)m/ne - 1$, $m = 2ne(d1+d2)/\lambda m$, ne is the extraordinary refractive index of said liquid crystal, no is the ordinary refractive index of said liquid crystal, and λm is a transmission peak wavelength.

4. An electrically tunable wavelength-selective filter as claimed in claim 1, wherein said transparent material layer is an organic polymer layer.

5. An electrically tunable wavelength-selective filter as claimed in claim 4, wherein said liquid crystal layer has an ordinary refractive index and an extraordinary refractive index, wherein said liquid crystal layer has a thickness d1, wherein said organic polymer layer has a thickness d2, and wherein the ratio d2/d1 of the thicknesses falls in a range from 0.8A to 1.2A inclusive, where $A = 0.75 \ (ne-no)m/ne - 1$, $m = 2ne(d1+d2)/\lambda m$, ne is the extraordinary refractive index of said liquid crystal, no is the ordinary refractive index of said liquid crystal, and λm is a transmission peak wavelength.

6. An electrically tunable wavelength-selective filter as claimed in claim 1, wherein said transparent material layer comprises a solid substance.

7. An electronically tunable wavelength-selective filter as claimed in claim 1, wherein the transparent material layer is at least as thick as the liquid crystal layer.

8. An electrically tunable wavelength-selective filter, comprising:
   a first tunable liquid crystal wavelength-selective filter; and
   a second tunable liquid crystal wavelength-selective filter which is stacked on said first tunable liquid crystal wavelength-selective filter;
   wherein said first tunable liquid crystal wavelength-selective filter includes
   a first glass substrate;
   a first transparent electrode layer;
   a first highly reflective mirror;
   a first alignment layer;
   a first liquid crystal layer;
   a second alignment layer;
   a transparent material layer whose refractive index is substantially equal to that of the liquid crystal of said liquid crystal layer;
   a second highly reflective mirror;
   a second transparent electrode layer; and a second glass substrate;
which are arranged in this sequence,
wherein said first and second highly reflective mirrors define an etalon cavity having an optical length and said transparent material layer is present to increase the optical length of the etalon cavity, and
wherein said second tunable liquid crystal wavelength-selective filter includes
a third glass substrate;
a third transparent electrode layer;
a third highly reflective mirror;
a third alignment layer;
a second liquid crystal layer;
a fourth alignment layer;
a fourth highly reflective mirror;
a fourth transparent electrode layer; and
a fourth glass substrate;
which are arranged in this sequence.

9. An electrically tunable wavelength-selective filter as claimed in claim 8, wherein said transparent material layer is a glass plate.

10. An electrically tunable wavelength-selective filter as claimed in claim 8, wherein said first tunable liquid crystal wavelength-selective filter and said second tunable liquid crystal wavelength-selective filter are stacked in such a manner that they are inclined with respect to each other.

11. An electrically tunable wavelength-selective filter as claimed in claim 8, wherein said transparent material layer is an organic polymer layer.

12. An electrically tunable wavelength-selective filter as claimed in claim 11, wherein said first tunable liquid crystal wavelength-selective filter and said second tunable liquid crystal wavelength-selective filter are stacked in such a manner that they are inclined with respect to each other.

13. An electrically tunable wavelength-selective filter as claimed in claim 8, wherein said second tunable liquid crystal wavelength-selective filter has an etalon cavity with an optical length, and wherein said optical length of said etalon cavity of said first tunable liquid crystal wavelength-selective filter is longer than said optical length of said etalon cavity of said second tunable liquid crystal wavelength-selective filter.

14. An electrically tunable wavelength-selective filter as claimed in claim 8, wherein said transparent material layer comprises a solid substance.

15. An electronically tunable wavelength-selective filter as claimed in claim 8, wherein the transparent material layer is at least as thick as the first liquid crystal layer.

16. A photodetector for receiving an optical signal via an input optical fiber, comprising:
lensing means for collimating light transmitted through said input optical fiber;
a fiber connecting portion connecting said input optical fiber to said lensing means;
polarization beam separation means for polarization separating said light transmitted through said lensing means into a first polarization light beam and a second polarization light beam;
polarization rotation means for rotating the polarization of said second polarization light beam;
an electrically tunable liquid crystal wavelength-selective filter selectively transmitting said first and second polarization light beams;
a focusing lensing means for focusing said first and second polarization light beams transmitted through said electrically tunable liquid crystal wavelength-selective filter; and
photodetecting means for detecting said first and second polarization light beams focused by said focusing lensing means,
wherein said electrically tunable liquid crystal wavelength-selective filter includes
a first glass substrate;
a first transparent electrode layer;
a first highly reflective mirror;
a first alignment layer;
a liquid crystal layer;
a second alignment layer;
a transparent material layer whose refractive index is substantially equal to that of the liquid crystal of said liquid crystal layer;
a second highly reflective mirror;
a second transparent electrode layer; and
a second glass substrate;
which are arranged in this sequence, and
wherein said first and second highly reflective mirrors define an etalon cavity having an optical length and said transparent material layer is present to increase the optical length of the etalon cavity.

17. A photodetector as claimed in claim 16, wherein said polarization rotation means is a $\lambda/2$ plate.

18. A photodetector as claimed in claim 16, wherein said polarization rotation mans is a $\lambda/4$ plate and a mirror.

19. A photodetector as claimed in claim 18, wherein said electrically tunable liquid crystal wavelength-selective filter is disposed so that said second polarization light beam is reflected from said electrically tunable liquid crystal wavelength-selective filter and through said $\lambda/4$ plate, and wherein said mirror is disposed so that said mirror reflects said second beam back through said $\lambda/4$ plate and to said electrically tunable liquid crystal wavelength-selective filter.

20. A photodetector as claimed in claim 16, wherein said polarization beam separation mans comprises a polarization beam splitter and a prism.

21. A photodetector as claimed in claim 16, wherein said polarization beam separation means is a birefringent plate.

22. A photodetector as claimed in claim 16, wherein said polarization beam separation means is disposed with respect to said tunable liquid crystal wavelength-selective filter so that light impinges on said tunable liquid crystal wavelength-selective filter at an angle of incidence that is not perpendicular to said tunable liquid crystal wavelength-selective filter.

23. A photodetector as claimed in claim 16, wherein said photodetecting means is a PIN photodiode or an avalanche photodiode.

24. A photodetector as claimed in claim 16, further comprising a multimode optical fiber disposed between said focusing lensing means and said photodetecting means.

25. An electrically tunable wavelength-selective filter as claimed in claim 16, wherein said transparent material layer comprises a solid substance.

26. A photodetector as claimed in claim 16, wherein the transparent material layer is at least as thick as the liquid crystal layer.

27. A photodetector for receiving an optical signal via an input optical fiber, comprising:

lensing means for collimating light transmitted through said input optical fiber;
a fiber connecting portion connecting said input optical fiber to said lensing means;
polarization beam separation means for polarization separating said light transmitted through said lensing means into a first polarization light beam and a second polarization light beam;
polarization rotation means for rotating the polarization of said second polarization light beam;
an electrically tunable liquid crystal wavelength-selective filter selectively transmitting said first and second polarization light beams;
a focusing lensing means for focusing said first and second polarization light beams transmitted through said electrically tunable liquid crystal wavelength-selective filter; and
photodetecting means for detecting said first and second polarization light beams focused by said focusing lensing means;
wherein said electrically tunable liquid crystal wavelength-selective filter includes a first tunable liquid crystal wavelength-selective filter, and a second tunable liquid crystal wavelength-selective filter which is stacked on said first tunable liquid crystal wavelength-selective filter,
wherein said first tunable liquid crystal wavelength-selective filter includes
a first glass substrate;
a first transparent electrode layer;
a first highly reflective mirror;
a first alignment layer;
a first liquid crystal layer;
a second alignment layer;
a transparent material layer whose refractive index is substantially equal to that of the liquid crystal of said liquid crystal layer;
a second highly reflective mirror;
a second transparent electrode layer; and
a second glass substrate;
which are arranged in this sequence,
wherein said first and second highly reflective mirrors define an etalon cavity having an optical length and said transparent material layer is present to increase the optical length of the etalon cavity, and
wherein said second tunable liquid crystal wavelength-selective filter includes
a third glass substrate;
a third transparent electrode layer;
a third highly reflective mirror;
a third alignment layer;
a second liquid crystal layer;
a fourth alignment layer;
a fourth highly reflective mirror;
a fourth transparent electrode layer; and
a fourth glass substrate;
which are arranged in this sequence.

28. An electrically tunable wavelength-selective filter as claimed in claim 27, wherein said transparent material layer comprises a solid substance.

29. A photodetector as claimed in claim 27, wherein the transparent material layer is at least as thick as the first liquid crystal layer.

30. A photodetector for receiving an optical signal via an input optical fiber, comprising:
lensing means for collimating light transmitted through said input optical fiber;
a fiber connecting portion connecting said input optical fiber to said lensing means;
polarization beam separation mans for polarization separating said light transmitted through said lensing means into a first polarization light beam and a second polarization light beam;
polarization rotation means for rotating the polarization of said second polarization light beam;
an electrically tunable liquid crystal wavelength-selective filter which selectively transmits said first and second polarization light beams; and
at least two photodiodes independently detecting said first and second polarization light beams transmitted through said electrically tunable liquid crystal wavelength-selective filter;
wherein said electrically tunable liquid crystal wavelength-selective filter includes
a first glass substrate;
a first transparent electrode layer;
a first highly reflective mirror;
a first alignment layer;
a liquid crystal layer;
a second alignment layer;
a transparent material layer whose refractive index is substantially equal to that of the liquid crystal of said liquid crystal layer;
a second highly reflective mirror; and
a second transparent electrode layer;
which are arranged in this sequence,
wherein said first and second highly reflective mirrors define an etalon cavity having an optical length and said transparent material layer is present to increase the optical length of the etalon cavity, and
wherein said second electrically tunable liquid crystal wavelength-selective filter and said photodiodes are integrally arranged in such a manner that said photodiodes are arranged on said second transparent electrode layer.

31. An electrically tunable wavelength-selective filter as claimed in claim 30, wherein said transparent material layer comprises a solid substance.

32. An electronically tunable wavelength-selective filter as claimed in claim 30, wherein the transparent material layer is at least as thick as the liquid crystal layer.

33. A photodetector arrangement for receiving an optical signal via an input fiber, comprising:
polarization beam separation means for polarization separating light that has been received through said input fiber into a first beam and a second beam;
polarization rotation means for rotating the polarization of said second beam;
an electrically tunable liquid crystal wavelength-selective filter which selectively transmits the first and second beams, said filter including
a first transparent substrate;
a first transparent electrode layer on the first substrate;
a first mirror on the first electrode layer;
a second transparent substrate;
a second transparent electrode layer on the second substrate;
a second mirror on the second electrode layer, the second mirror being spaced apart from the first mirror;
a liquid crystal layer; and a transparent material layer made of a solid substance whose refractive index is substantially equal to that of the liquid crystal, the liquid crystal layer and the transparent material layer being disposed between the first and second mirrors; and at least one photodetector which receives light transmitted through the filter, wherein the first and second mirrors define an etalon cavity having an optical length and the transparent material layer is present to increase the optical length of the etalon cavity.

34. The photodetector arrangement of claim 33, further comprising a fiber connecting portion which receives the input fiber, means for collimating light from the input fiber before the light reaches the polarization beam separation means, and a lens between the filter and the at least one photodetector.

35. The photodetector arrangement of claim 33, further comprising an additional electrically tunable liquid crystal wavelength-selective filter, the filters being bonded to one another, the additional filter including
a pair of transparent additional electrode layers;
a pair of additional mirrors between the additional electrode layers; and
an additional liquid crystal layer between the additional electrode layers.

36. The photodetector arrangement of claim 35, wherein the filters are tilted with respect to one another.

37. The photodetector arrangement of claim 33, wherein the polarization rotation means comprises a λ/2 plate disposed between the polarization beam separation means and the filter, the second beam but not the first beam passing through the λ/2 plate.

38. The photodetector arrangement of claim 33, wherein the polarization rotation means comprises a λ/4 plate positioned so that the second beam passes through it, and means for reflecting the second beam back through the λ/4 plate.

39. The photodetector arrangement of claim 33, wherein the first electrode layer has first and second portions that are electrically isolated from one another, the first beam passing through the first portion and the second beam passing through the second portion, and further comprising means for maintaining the first and second portions at different electrical potentials.

40. The photodetector arrangement of claim 33, wherein the second transparent substrate is in InP substrate, and wherein the at least one photodetector comprises a plurality of GaInAs photodiodes on the InP substrate, the photodetectors receiving light through the InP substrate.

41. The photodetector arrangement of claim 33, wherein the transparent material layer is at least as thick as the liquid crystal layer.

42. A photodetector arrangement for receiving an optical signal via an input fiber, comprising:
an electrically tunable liquid crystal wavelength-selective filter having an input side on which light that has been received through the input fiber is incident, incident light that has a first polarization passing through the filter in a first beam and incident light that has a second polarization being reflected from the input side of the filter in a second beam, the filter including
a first transparent substrate;
a first transparent electrode layer on the first substrate;
a first mirror on the first electrode layer;
a second transparent substrate;
a second transparent electrode layer on the second substrate;
a second mirror on the second electrode layer, the second mirror being spaced apart from the first mirror;
a liquid crystal layer; and
a transparent material layer made of a solid substance whose refractive index is substantially equal to that of the liquid crystal, the liquid crystal layer and the transparent material layer being disposed between the first and second mirrors;
a λ/4 plate disposed adjacent the input side of the filter at a position where the second beam passes through it;
means for reflecting the second beam back through the λ/4 plate and through the filter; and
at least one photodetector which receives light which passes through the filter,
wherein the first and second mirrors define an etalon cavity having an optical length and the transparent material layer is present to increase the optical length of the etalon cavity.

43. The photodetector arrangement of claim 42, wherein the at least one photodetector is a single photodetector, and further comprising means for focusing the first and second beams on the single photodetector after they have passed through the filter.

44. The photodetector arrangement of claim 42, wherein the transparent material layer is at least as thick as the liquid crystal layer.

* * * * *